United States Patent
Davydov et al.

(10) Patent No.: US 12,250,046 B2
(45) Date of Patent: Mar. 11, 2025

(54) CHANNEL STATE INFORMATION CONCATENATION AND ANTENNA PORT MEASUREMENT

(71) Applicant: Apple Inc., Cupertino, CA (US)

(72) Inventors: Alexei Davydov, Nizhny Novgorod (RU); Sameer Pawar, Santa Clara, CA (US); Wook Bong Lee, San Jose, CA (US); Yushu Zhang, Beijing (CN); Victor Sergeev, Nizhny Novgorod (RU); Joonyoung Cho, Portland, OR (US); Dmitry Dikarev, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/520,202

(22) Filed: Nov. 27, 2023

(65) Prior Publication Data
US 2024/0097767 A1    Mar. 21, 2024

Related U.S. Application Data

(60) Division of application No. 17/334,207, filed on May 28, 2021, now Pat. No. 11,848,736, which is a
(Continued)

(51) Int. Cl.
*H04B 7/06* (2006.01)

(52) U.S. Cl.
CPC ......... *H04B 7/0658* (2013.01); *H04B 7/0626* (2013.01); *H04B 7/0632* (2013.01); *H04B 7/0634* (2013.01)

(58) Field of Classification Search
CPC .. H04B 7/0658; H04B 7/0626; H04B 7/0632; H04B 7/0634; H04B 7/0656; H04B 7/0623
See application file for complete search history.

(56) References Cited

U.S. PATENT DOCUMENTS

| 10,051,489 B2 | 8/2018 | Tong et al. |
| 10,181,964 B2 * | 1/2019 | Yum .................... H04B 17/345 |

(Continued)

FOREIGN PATENT DOCUMENTS

| CN | 102237969 A | 11/2011 |
| CN | 103503327 A | 1/2014 |

(Continued)

OTHER PUBLICATIONS

International Patent Office—International Search Report and Written Opinion mailed Oct. 31, 2018, from International Application No. PCT/US2018/037351, 21 pages.
(Continued)

*Primary Examiner* — Jean B Corrielus
(74) *Attorney, Agent, or Firm* — Sterne, Kessler, Goldstein & Fox P.L.L.C.

(57) ABSTRACT

Herein described are apparatuses, systems, and methods for measurement and reporting of channel state information within wireless network systems. In embodiments, an apparatus for a user equipment (UE) may include memory to store a rank indicator (RI), a precoding matrix index (PMI), and a channel quality indicator (CQI) of channel state information (CSI) for the UE. The apparatus may further include circuitry to concatenate the RI, the PMI, and the CQI to produce a concatenated CSI element, generate a CSI report that includes the concatenated CSI element, and cause the CSI report to be transmitted to a base station within a single slot. Other embodiments may be described and/or claimed.

20 Claims, 17 Drawing Sheets

Related U.S. Application Data continuation of application No. 16/479,195, filed as application No. PCT/US2018/037351 on Jun. 13, 2018, now Pat. No. 11,025,326.

(60) Provisional application No. 62/531,571, filed on Jul. 12, 2017, provisional application No. 62/520,846, filed on Jun. 16, 2017.

(56) References Cited

U.S. PATENT DOCUMENTS

| | | |
|---|---|---|
| 10,419,176 B2 | 9/2019 | Tavildar et al. |
| 10,735,980 B2 | 8/2020 | Xu et al. |
| 10,965,410 B2 | 3/2021 | Kwak et al. |
| 2009/0046805 A1 | 2/2009 | Kim et al. |
| 2013/0083685 A1 | 4/2013 | Lee et al. |
| 2014/0126383 A1 | 5/2014 | Tong et al. |
| 2014/0133445 A1 | 5/2014 | Zhu et al. |
| 2014/0362941 A1 | 12/2014 | Gomadam et al. |
| 2015/0189644 A1 | 7/2015 | Lorca Hernando |
| 2015/0373694 A1 | 12/2015 | You et al. |
| 2016/0142189 A1 | 5/2016 | Shin et al. |
| 2016/0142191 A1 | 5/2016 | Davydov et al. |
| 2016/0226709 A1 | 8/2016 | Chen et al. |
| 2017/0134082 A1 | 5/2017 | Yum et al. |
| 2017/0142715 A1 | 5/2017 | Li et al. |
| 2017/0195016 A1 | 7/2017 | Alexander et al. |
| 2018/0227156 A1 | 8/2018 | Papasakellariou |
| 2018/0234147 A1 | 8/2018 | Lee et al. |
| 2018/0241454 A1 | 8/2018 | Lee et al. |
| 2019/0253910 A1 | 8/2019 | Lee |
| 2019/0349057 A1 | 11/2019 | Davydov et al. |
| 2020/0052750 A1 | 2/2020 | Manolakos et al. |
| 2020/0178103 A1 | 6/2020 | Lunttila et al. |
| 2020/0252824 A1 | 8/2020 | Dinan |
| 2020/0322816 A1 | 10/2020 | Xu et al. |

FOREIGN PATENT DOCUMENTS

| | | | | |
|---|---|---|---|---|
| CN | 103812619 A | 5/2014 | | |
| CN | 105122869 A | 12/2015 | | |
| CN | 112653495 A | 4/2021 | | |
| EP | 2863565 A1 | 4/2015 | | |
| GB | 2507782 A | 5/2014 | | |
| KR | 2017 0063628 A | 6/2017 | | |
| WO | WO 2015/099511 A1 | 7/2015 | | |
| WO | WO-2015167119 A1 | * | 11/2015 | ............ H04B 17/24 |
| WO | WO-2017025114 A1 | * | 2/2017 | ............ H04L 1/0026 |
| WO | WO 2017107671 A1 | 6/2017 | | |

OTHER PUBLICATIONS

3GPP, "Technical Specification Group Radio Access Network; Study on New Radio Access Technology Physical Layer Aspects (Release 14)," 3GPP TR 38.802 V14.0.0 (Mar. 2017), 5G, 143 pages.

1st Office Action and Search Report, dated Nov. 2, 2022, from Chinese Patent Appl. No. 201880046368.8, 10 pages with English Translation.

2nd Office Action and Search Report, dated May 13, 2023, from Chinese Patent Appl. No. 201880046368.8, 13 pages with English Translation.

* cited by examiner

| Rank | Configuration/ Applicability | | $i_1$ (bits) | $i_2$ (bits/ SB) | Example (# SB = 4, N1xN2=16, CQI=4bit/ SB, RI=3bits) | | |
|---|---|---|---|---|---|---|---|
| | | | | | RI+PMI | CQI | Total |
| 1 | L = 1 | | $\lceil \log(N_1 O_1 \times N_2 O_2) \rceil$ | 2 | 19 | 16 | 35 |
| | L = 4 | $N_2 = 1$ | $\lceil \log(N_1 O_1 \times N_2 O_2) \rceil - 1$ | 4 | | | |
| | | $N_2 > 1$ | $\lceil \log(N_1 O_1 \times N_2 O_2) \rceil - 2$ | | 25 | 16 | 41 |
| 2 | L = 1 | | $\lceil \log(N_1 O_1 \times N_2 O_2) \rceil + 2$ | 1 | 17 | 16 | 33 |
| | L = 4 | $N_2 = 1$ | $\lceil \log(N_1 O_1 \times N_2 O_2) \rceil + 1$ | 3 | 24 | 16 | 40 |
| | | $N_2 > 1$ | $\lceil \log(N_1 O_1 \times N_2 O_2) \rceil$ | | 23 | 16 | 39 |
| 3-4 | # of ports < 16 | | $\lceil \log(N_1 O_1 \times N_2 O_2) \rceil + 2$ | 1 | | | |
| | # of ports ≥ 16 | | $\lceil \log\left(\frac{N_1 O_1}{2} \times N_2 O_2\right) \rceil + 2$ | 1 | 16 | 16 | 32 |
| 5-6 | - | | $\lceil \log(N_1 O_1 \times N_2 O_2) \rceil$ | 1 | 15 | 32 | 47 |
| 7-8 | $(N_1, N_2) = (4,1)$ | | $\lceil \log\left(\frac{N_1 O_1}{2} \times N_2 O_2\right) \rceil$ | 1 | | | |
| | $N_1 > 2, N_2 = 2$ | | $\lceil \log\left(N_1 O_1 \times \frac{N_2 O_2}{2}\right) \rceil$ | 1 | 14 | 32 | 46 |
| | otherwise | | $\lceil \log(N_1 O_1 \times N_2 O_2) \rceil$ | 1 | 15 | 32 | 47 |

FIG. 1

CHANNEL STATE INFORMATION CONCATENATION AND ANTENNA PORT MEASUREMENT

RELATED APPLICATIONS

The present application is a divisional of U.S. patent application Ser. No. 17/334,207, filed May 28, 2021, entitled "CHANNEL STATE INFORMATION CONCATENATION AND ANTENNA PORT MEASUREMENT," issued as U.S. Pat. No. 11,848,736, which is a continuation of U.S. patent Application Ser. No. 16/479,195, filed Jul. 18, 2019, entitled "CHANNEL STATE INFORMATION CONCATENATION AND ANTENNA PORT MEASUREMENT," issued as U.S. Pat. No. 11,025,326, which is a U.S. National Phase of International Application No. PCT/US2018/037351, filed Jun. 13, 2018, which claims priority to U.S. Provisional patent Application No. 62/520,846, filed Jun. 16, 2017, entitled "SINGLE SLOT CHANNEL STATE INFORMATION (CSI) REPORTING" and U.S. Provisional patent Application No. 62/531,571, filed Jul. 12, 2017, entitled "ANTENNA PORT CONFIGURATION FOR NEW RADIO COMMUNICATION SYSTEMS," all of which are herein incorporated by reference in their entireties.

TECHNICAL FIELD

The present disclosure relates to the field of wireless network systems. More particularly, the present disclosure relates to the measurement and reporting of channel state information within wireless network systems.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

In legacy wireless systems, base stations supported user equipment having similar capabilities. The user equipment would measure channel state information (CSI) for all the antenna ports of a base station to generate a CSI report. Further, the user equipment would report portions of the CSI in different slots of a frame structure. As the number of antenna ports supported by the base stations have increased, efficiency in CSI reporting may be available.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 1 illustrates a table showing example channel state information (CSI) content, according to various embodiments.

DETAILED DESCRIPTION

Figures 2, 3:
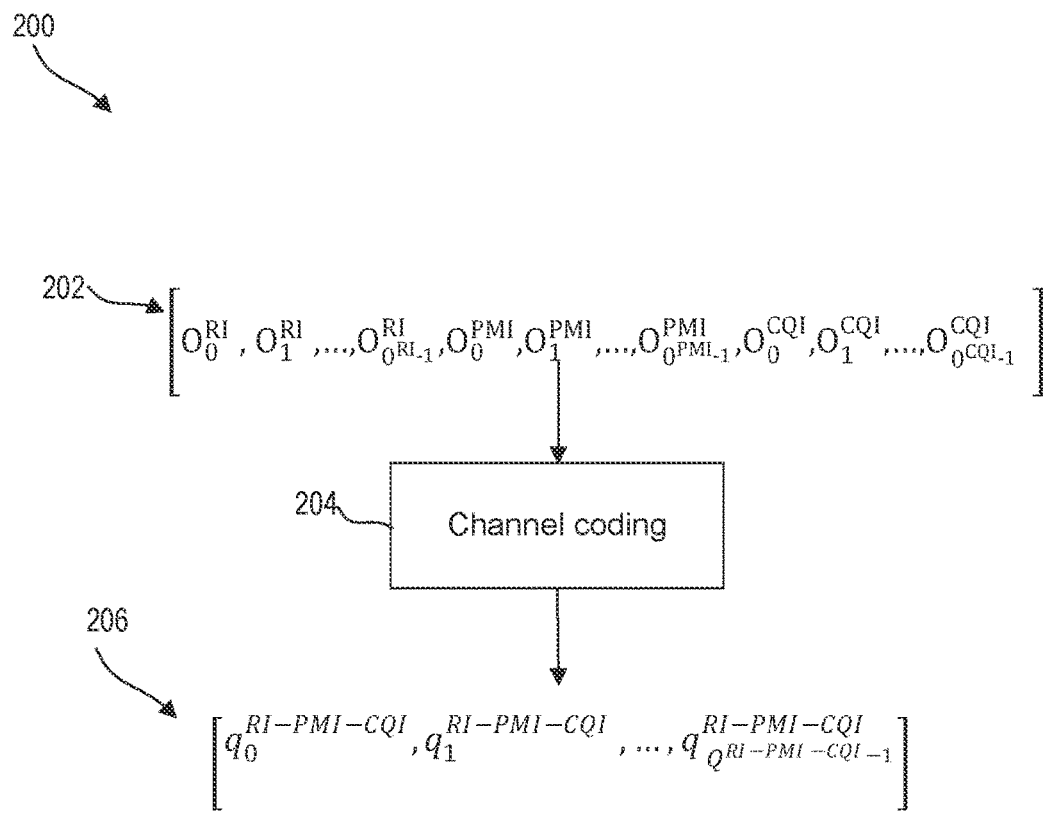
FIG. 2 illustrates an example of CSI concatenation approach, according to various embodiments.
FIG. 3 illustrates an example table showing example rate indication (RI)-precoding matrix indication (PMI) indices, according to various embodiments.

Herein described are apparatuses, systems, and methods for measurement and reporting of channel state information within wireless network systems. In embodiments, an apparatus for a user equipment (UE) may include memory to store a rank indicator (RI), a precoding matrix index (PMI), and a channel quality indicator (CQI) of channel state information (CSI) for the UE. The apparatus may further include circuitry to concatenate the RI, the PMI, and the CQI to produce a concatenated CSI element, generate a CSI report that includes the concatenated CSI element, and cause the CSI report to be transmitted to a base station within a single slot.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

FIG. 1 illustrates a table 100 showing example channel state information (CSI) content, according to various embodiments. In particular, the table 100 illustrates CSI content and content size for an example new radio (NR) type I single panel codebook.

The table 100 indicates CSI content dependent on rank (or rank indicator (RI)) for the CSI, as indicated by the rank column 102. The rank may indicate how many multiple-input, multiple-output (MIMO) layers are preferred for downlink transmission for a user equipment (UE). The size of the elements within the CSI may be dependent, at least partially, on the rank.

The table 100 further indicates a configuration of a codebook associated with the UE, as indicated by configuration column 104. For example, the configuration for the codebook may be dependent on a special codebook configuration element, represented by L in the illustrated embodiment, and/or a number of antenna elements or antenna ports, as represented by a number of antenna elements $N_1$ in the horizontal dimension of an antenna array and a number of antenna elements $N_2$ in the vertical dimension of the antenna array. The size of the elements within the CSI may be dependent, at least partially, on the configuration of the codebook.

The table 100 further indicates a number of bits that indicates a subset of beams to be utilized for transmissions, as represented by $i_1$ and indicated by $i_1$ column 106. The number of bits that indicate a subset of beams may vary based on the rank for the CSI, the configuration of the codebook, or some combination thereof. In particular, an equation for determining the number of bits may differ, as indicated in the table 100, based on the rank for the CSI, the configuration of the codebook, or some combination thereof. Further, the calculation of the number of the bits may depend on the number of antenna ports, as represented by $N_1$ and $N_2$ in the illustrated embodiment, and/or a density of beams emitted from the antenna array, as represented by a density $O_1$ in the horizontal dimension of the antenna array and a density $O_2$ in the vertical dimension of the antenna array.

The table 100 further indicates a number of bits that indicates an exact beam to be utilized for transmissions, as represented by $i_2$ and indicated by $i_2$ column 108. The number of bits that indicate the exact beam may vary based on the rank for the CSI, the configuration of the codebook, or some combination thereof. The number of bits may be defined based on a number of bits per sub band (SB), where the values indicated in the $i_2$ column 108 indicate a number of bits utilized to indicate the exact beam per SB.

The table 100 further indicates example numbers of bits for elements of the CSI for a particular scenario, as represented by CSI bit size column 110. In particular, the scenario may include an arrangement having 4 SBs, 16 antenna elements (or antenna ports), 4 bits per SB, for a channel quality indicator (CQI), and 3 bits for a rank indicator (RI). In particular, the CSI bit size column 110 includes: an RI/precoder matrix indicator (PMI) subcolumn 112 that indicates a number of bits utilized for providing RI and PMI within the CSI; a CQI subcolumn 114 that indicates a number of bits utilized for providing CQI within the CSI; and a total subcolumn 116 that indicates a total number of bits utilized for the CSI. As can be seen from the table 100, a total number of bits utilized for the CSI may vary based on the rank, the codebook configuration, or some combination thereof A base station (such as a NodeB (NB), an evolved NodeB (eNB), a next generation NodeB (gNB), RAN Node XS11 (FIG. 14), and/or RAN Node XS12 (FIG. 14)) may not know the total number of bits utilized for the CSI until a CSI report is received at the base station. For example, the base station may determine the total number of bits utilized for the CSI from the received CSI report. Further, NR may support single codeword for CSI up to rank of 4 and two codewords for CSI for ranks greater than 4, which may cause double CQI size and further variation in the total number of bits utilized for the CSI.

Further, a format of a physical uplink control channel (PUCCH) transmission carrying a CSI report and/or an amount of resources for a selected PUCCH format carrying the CSI report may vary somewhat dynamically based on the RI. For example, the number of physical resource blocks (PRBs) for CSI transmission may change depending on the RI and/or the CSI feedback mode. In particular, the number of PRBs used for the CSI report may change dynamically with changes (increase or decrease) in CSI content size. The resource to be used for transmission of the CSI report may be configured via higher layers or may be defined in technical specifications related to 5G.

In some embodiments, the PUCCH format and amount of resources utilized for transmission of the CSI report may be configured to support a maximum CSI content size. In these embodiments, when the CSI content size is smaller than the maximum CSI content size, filler bits may be added to the CSI in the CSI report to transform the CSI content size in the CSI report to the maximum CSI content size. For example, bits having a value of 0 may be added to the CSI to increase the CSI content size to the maximum CSI content size for a CSI report.

In instances where both the base station and the UE are aware of the CSI elements included a CSI report, the PUCCH format and/or an amount of a resource for transmission of the CSI report may change accordingly. In particular, both the base station and the UE may be configured to be aware of the PUCCH format and the resources utilized for transmission of the CSI report, such that the UE may format the CSI report in a defined format and transmit the CSI report on defined resources, and the base station may monitor the defined resources for the CSI report and determine the information included in the CSI report based on the defined format. This may provide for more efficient reporting of the CSI information than embodiments where either the base station or the UE are unaware of the PUCCH format and/or amount of resources utilized for the transmission of the CSI report.

In case of single slot reporting, the size of CSI contents can depend on the RI, which may not be known at the base station prior to the report. Furthermore, NR may support single codeword up to rank 4 and two codewords otherwise, which may cause double CQI size for above rank 4. In order to support various PUCCH sizes, which can change somewhat dynamically depending on the reported RI, the format of the PUCCH carrying the CSI report and the amount of the resource used for the selected PUCCH format, e.g., number of physical resource blocks, can change depending on the RI as well as the CSI feedback mode. More specifically, the number of used physical resource blocks (PRBs) may change dynamically with an increase in CSI contents size. Which resource to use as the amount of resource changes can be configured via higher layers or predefined in the specification. In another approach, the PUCCH format and the amount of the resource can be configured and used in the way to support the case of the maximum CSI contents size. In cases that both the base station and the UE are aware of what combinations of CSI fields are included in the CSI report, the PUCCH format and the amount of the resource can change accordingly.

FIG. 2 illustrates an example of CSI concatenation approach 200, according to various embodiments. The CSI concatenation approach 200 may be performed by a UE for generation of a CSI report to be transmitted to a base station. In some embodiments, baseband circuitry (such as baseband circuitry XT04 (FIG. 15)) of the UE may perform the CSI concatenation approach 200. The UE may perform the CSI concatenation approach 200 in response to receiving and/or identifying a channel state information reference signal (CSI-RS) from the base station.

For the CSI concatenation approach 200, the UE may concatenate an RI, a PMI, and a CQI (collectively, "CSI elements") of CSI for the UE prior to coding of the CSI for transmission within a CSI report. For example, the UE may determine values for the RI, the PMI, and the CQI via measuring of a channel based on the CSI-RS received from the base station.

Prior to concatenation, the UE may determine whether a payload size of the CSI elements is a maximum payload size. In particular, the UE may compare bit sizes of the RI, the PMI, and the CQI with maximum predefined bit sizes for RI, PMI, and CQI. If the UE determines that the RI, the PMI, and the CQI are the maximum predefined bit sizes, the UE may proceed to concatenation. If the UE determines that any of the RI, the PMI, and the CQI are smaller than the maximum predefined bit sizes, the UE may add filler bits to the RI, the PMI, and/or the CQI to have the RI, the PMI, and the CQI be the maximum predefined bit sizes prior to concatenation.

The UE may concatenate the RI, the PMI, and the CQI to produce a concatenated CSI element 202. For example, the bits for the RI are represented by $o_0^{RI}, o_1^{RI} \ldots o_0^{RI}-1$ in the illustrated embodiment, with the maximum bit size of RI $o^{RI}$. The table 100 shows $o^{RI}$ equal to 3. Further, the bits for PMI are represented by $o_0^{PMI}, o_1^{PMI} \ldots, o_{0^{PMI}-1}^{PMI}$ in the illustrated embodiment, with the maximum bit size of PMI $o^{PMI}$. The table 100 shows $o^{PMI}$ equal to 16 for L=1 and $o^{PMI}$ equal to 22 for L=4. Further, the bits for CQI are represented by $o_0^{CQI}, o_1^{CQI} \ldots, o_{0^{CQI}-1}^{CQI}$ in the illustrated embodiment, with the maximum bit size of CQI $o^{CQI}$. The table 100 shows $o^{CQI}$ equal to 32.

The UE may then encode the concatenated CSI element 202. For example, the UE may perform a channel coding procedure 204 with the concatenated CSI element 202. The UE may encode the concatenated CSI element 202 by polar code, Reed-Muller code, or some other code utilized for CSI reporting. The channel coding of the concatenated CSI element 202 may result in encoded CSI element 206. The encoded CSI element 206 may include jointly encoded bits $q_0^{RI-PMI-CQI}, q_1^{RI-PMI-CQI} \ldots, q_{0^{RI-PMI-CQI}-1}^{RI-PMI-CQI}$.

In some embodiments, the UE may limit the RI to a certain number. For example, the range of possible RI may be limited to 4. In these embodiments, the size of the CQI may be fixed to 16 (assuming 4 SBs). Accordingly, a size variation corresponding to different ranks may be smaller.

FIG. 3 illustrates an example table 300 showing example rate indication (RI)-precoding matrix indication (PMI) indices, according to various embodiments. In particular, a UE may perform joint RI and PMI indexing, resulting in RI-PMI indices in some embodiments. For example, baseband circuitry (such as baseband circuitry XT04 (FIG. 15)) of the UE may perform the joint RI and PMI indexing in some embodiments. Each of the RI-PMI values for the RI-PMI indices may correspond to particular combinations of RI and PMI values.

The table 300 includes an RI-PMI index column 302, an RI column 304, and a PMI column 306. The RI-PMI index value in a row may correspond to an RI and a PMI within the same row. For example, the RI-PMI index value in a first row 308 may correspond to the RI in the first row 308 and the PMI in the first row 308. A size of the RI-PMI index may be set to a fixed value, which may a maximum possible size of the RI-PMI index.

Figure 4:
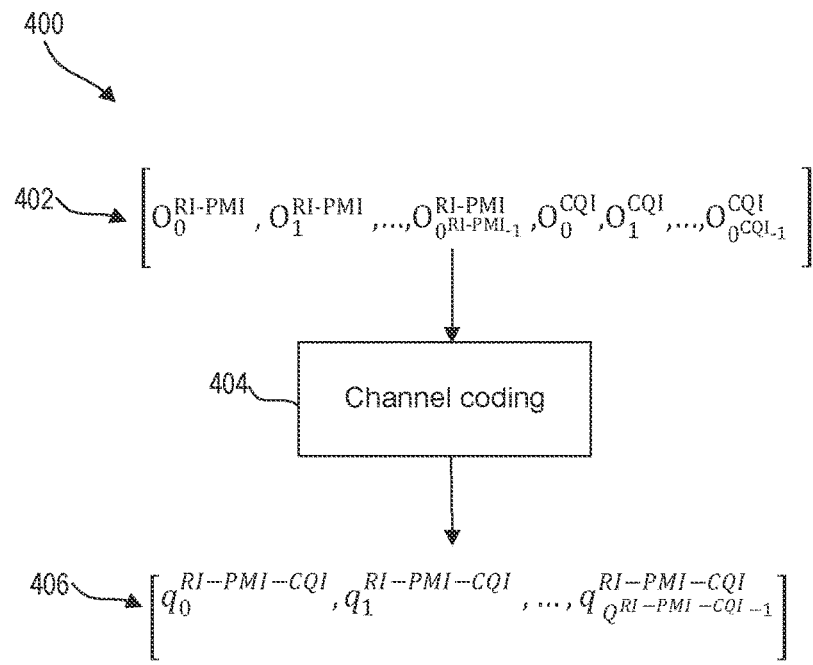
FIG. 4 illustrates another example of CSI concatenation approach, according to various embodiments.

FIG. 4 illustrates another example of CSI concatenation approach 400, according to various embodiments. In particular, the CSI concatenation approach 400 may utilize the RI-PMI indices, as described in regards to table 300 (FIG. 3). The CSI concatenation approach 400 may be performed by a UE for generation of a CSI report to be transmitted to a base station. For example, baseband circuitry (such as baseband circuitry XT04 (FIG. 15)) of the UE may perform the CSI concatenation approach 400 in some embodiments. The UE may perform the CSI concatenation approach 400 in response to receiving and/or identifying a CSI-RS from the base station.

The UE may determine values for the RI, the PMI, and the CQI via measuring of a channel based on the CSI-RS received from the base station. The UE may perform the RI and PMI indexing described in relation to FIG. 3 to generate RI-PMI index values based on the determined RI and PMI. The UE may then concatenate the RI-PMI index values with the CQI.

Prior to concatenation, the UE may determine whether a payload size of the RI-PMI index values and/or the CQI are maximum payload sizes, respectively. In particular, the UE may compare bit sizes of the RI-PMI index values within maximum predefined bit sizes for the RI-PMI index. Further, the UE may compare bit sizes of the CQI with maximum predefined bit sizes for the CQI. If the UE determines that the RI index values and the CQI are the maximum predefined bit sizes, the UE may proceed to concatenation. If the UE determines that either of the RI-PMI index values or the CQI are smaller than the maximum predefined bit sizes, the UE may add filler bits to the RI-PMI index values and/or the CQI to have the RI-PMI index values and the CQI be the maximum predefined bit sizes prior to concatenation.

The UE may concatenate the RI-PMI index values and the CQI to produce a concatenated CSI element 402. For example, the bits for the RI-PMI index values are represented by $o_0^{RI-PMI}$, $o_1^{RI-PMI}$ ..., $o_{O^{RI-PMI}-1}^{RI-PMI}$ in the illustrated embodiment, with the maximum bit size of CQI $o^{CQI}$. The table 100 shows $o^{CQI}$ equal to 32.

The UE may then encode the concatenated CSI element 402. For example, the UE may perform a channel coding procedure 404 with the concatenated CSI element 402. The UE may encode the concatenated CSI element 402 by polar code, Reed-Muller code, or some other code utilized for CSI reporting. The channel coding of the concatenated CSI element 402 may result in encoded CSI element 406. The encoded CSI element 406 may include jointly encoded bits $q_0^{RI-PMI-CQI}$, $q_1^{RI-PMI-CQI}$ ..., $q_{O^{RI-PMI-CQI}-1}^{RI-PMI-CQI}$.

Figure 5:
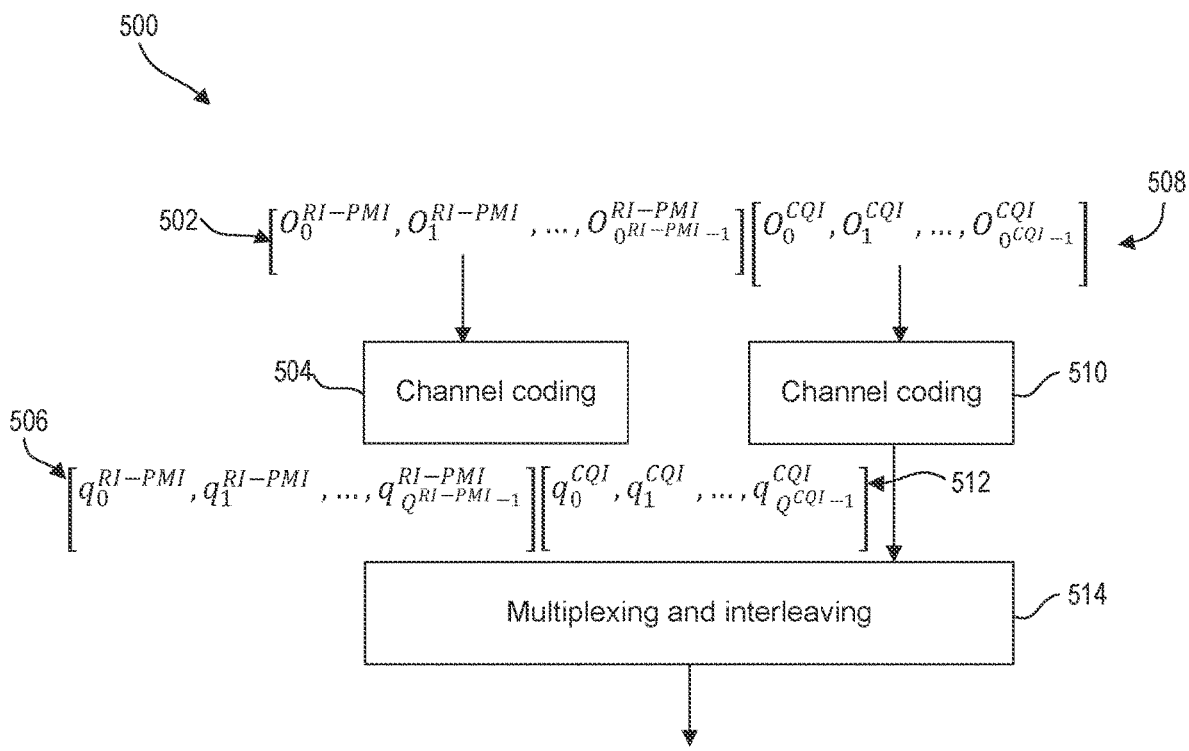
FIG. 5 illustrates another example of CSI concatenation approach, according to various embodiments.

FIG. 5 illustrates another example of CSI concatenation approach 500, according to various embodiments. In particular, the CSI concatenation approach 500 may utilize the RI-PMI indices, as described in regards to table 300 (FIG. 3). The CSI concatenation approach 500 may be performed by a UE for generation of a CSI report to be transmitted to a base station. For example, baseband circuitry (such as baseband circuitry XT04 (FIG. 15)) may perform the CSI concatenation approach 500. The UE may perform the CSI concatenation approach 500 in response to receiving and/or identifying a CSI-RS from the base station.

The UE may determine values for the RI, the PMI, and the CQI via measuring of a channel based on the CSI-RS received from the base station. The UE may perform the RI and PMI indexing described in relation to FIG. 3 to generate RI-PMI index values based on the determined RI and PMI.

In CSI concatenation approach 500, the UE may encode the RI-PMI index values 502 and the CQI 508 prior to concatenation of the RI-PMI index values 502 with the CQI 508. For example, the bits for the RI-PMI index values 502 are represented by $o_0^{RI-PMI}$, $o_1^{RI-PMI}$ ..., $o_{O^{RI-PMI}-1}^{RI-PMI}$ in the illustrated embodiment, with the maximum bit size of RI-PMI index $o^{RI-PMI}$. The UE may perform a channel coding procedure 504 with the RI-PMI index values 502. The UE may encode the RI-PMI index values 502 by polar code, Reed-Muller code, or some other code utilized for CSI reporting. The channel coding of the RI-PMI index values 502 may result in encoded RI-PMI index values 506. The encoded RI-PMI index values 506 may include encoded bits $q_0^{RI-PMI}$, $q_1^{RI-PMI}$ ..., $q_{O^{RI-PMI}-1}^{RI-PMI}$.

Further, the bits for CQI 508 are represented by $o_0^{CQI}$, $o_1^{CQI}$ ..., $o_{O^{CQI}-1}^{CQI}$ in the illustrated embodiment, with the maximum bit size of CQI $o^{CQI}$. In embodiments where the RI is equal to or smaller than 4, the $o^{CQI}$ may be equal to 16. In embodiments where the RI is equal to or greater than 4, the $o^{CQI}$ may be equal to 32. The UE may perform a channel coding procedure 510 with CQI 508. The UE may encode the CQI 508 by polar code, Reed-Muller code, or some other code utilized for CSI. In some embodiments, the UE may encode the CQI 508 by a different code format than the RI-PMI index values 502. For example, the RI-PMI index values 502 may be encoded by Reed-Muller code, whereas the CQI 508 may be encoded by polar code. The channel coding of the CQI 508 may result in encoded CQI 512. The encoded CQI 512 may include the encoded bits $q_0^{CQI}$, $q_1^{CQI}$ ..., $q_{O^{CQI}-1}^{CQI}$. In some embodiments, the coding rate for the RI-PMI index values 502 may be lower than a coding rate for the CQI 508.

The UE may then perform a multiplexing and interleaving operation 514 with the encoded RI-PMI index values 506 and the encoded CQI 512. For example, the two sequences of encoded bits corresponding to the encoded RI-PMI index values 506 and the encoded CQI 512, respectively, may be multiplexed and interleaved before being mapped to resources for transmission. The multiplexing and interleaving of the encoded RI-PMI index values 506 and the encoded CQI 512 may produce a concatenated CSI element. In some embodiments, the baseband circuitry of the UE may cause radio frequency (RF) circuitry (such as RF circuitry XT06 (FIG. 15)) of the UE to perform the multiplexing and interleaving. In other embodiments, the baseband circuitry of the UE may perform the multiplexing and interleaving. In some embodiments, each encoded bit of the encoded RI-PMI index values 506 and the encoded CQI 512 may be mapped to different PUCCH formats. For example, each encoded bit of the encoded RI-PMI index values 506 may be mapped in a different PUCCH format from the encoded CQI 512. In some embodiments, each encoded bit of the encoded RI-PMI index values 506 and the encoded CQI 512 may be mapped to different PUCCH symbols. For example, each encoded bit of the encoded RI-PMI index values 506 may be mapped to a different PUCCH symbol from the encoded CQI 512.

Figure 6:
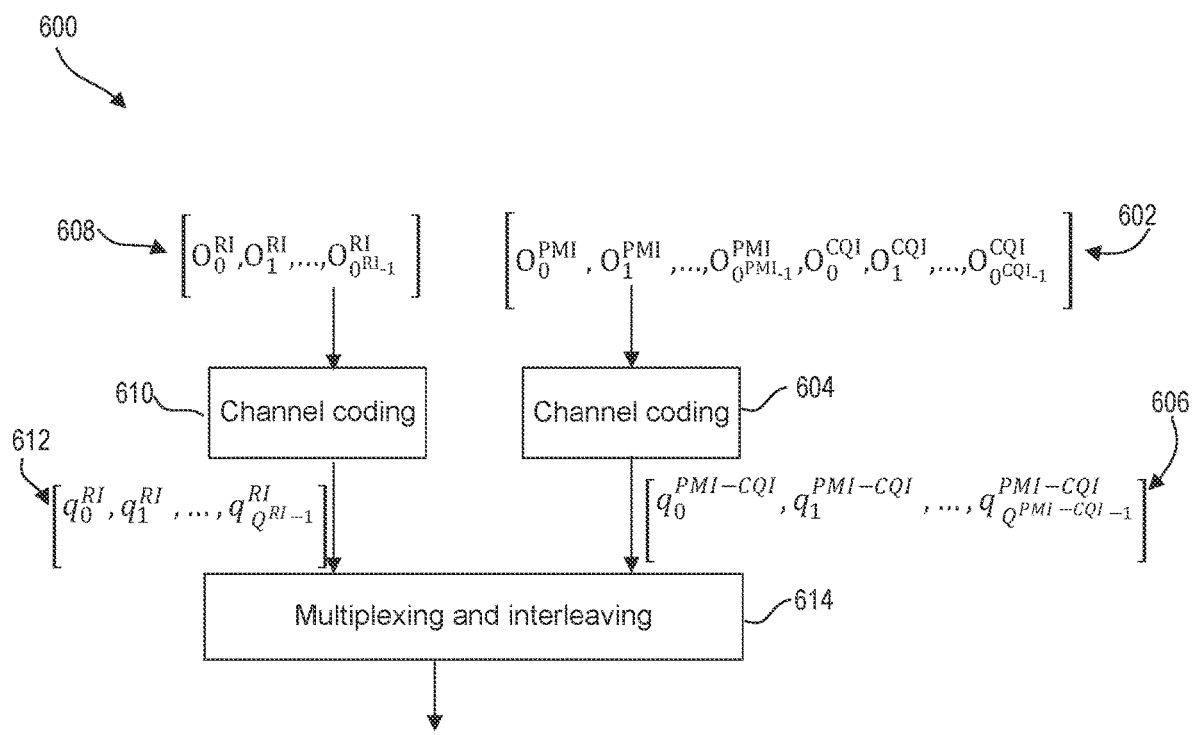
FIG. 6 illustrates another example of CSI concatenation approach, according to various embodiments.

FIG. 6 illustrates another example of CSI concatenation approach 600, according to various embodiments. In particular, the CSI concatenation approach 600 may concatenate the PMI and CQI prior to encoding and further concatenate with the RI after encoding. The CSI concatenation approach 600 may be performed by a UE for generation of a CSI report to be transmitted to a base station. For example, baseband circuitry (such as baseband circuitry XT04 (FIG. 15)) may perform the CSI concatenation approach 600. The UE may perform the CSI concatenation approach 600 in response to receiving and/or identifying a CSI-RS from the base station.

The UE may determine values for the RI, the PMI, and the CQI via measuring of a channel based on the CSI-RS received from the base station. In CSI concatenation approach 600, the UE may concatenate the PMI and the CQI prior to encoding to produce concatenated PMI-CQI 602. The bits for the PMI are represented by $o_0^{PMI}$, $o_1^{PMI}$ ..., $o_{O^{PMI}-1}^{PMI}$ within the concatenated PMI-CQI 602. Further, the bits for CQI are represented by $o_0^{CQI}$, $o_1^{CQI}$ ..., $o_{O^{CQI}-1}^{CQI}$. The bit size of the PMI and the CQI may be determined based on the RI.

The UE may perform a channel coding procedure 604 with the concatenated PMI-CQI 602. For example, the UE may encode the concatenated PMI-CQI 602 by polar code, Reed-Muller code, or some other code utilized for CSI reporting. The channel coding of the concatenated PMI-CQI 602 may result in encoded PMI-CQI 606. The encoded PMI-CQI 606 may include bits $q_0^{PMI-CQI}$, $q_1^{PMI-CQI}$ ..., $q_{O^{PMI-CQI}-1}^{PMI-CQI}$.

Further, the bits for RI 608 are represented by $o_0^{RI}$, $o_1^{RI}$ ... $o_{O^{RI}-1}^{RI}$ in the illustrated embodiment, with the maximum bit size of RI $o^{RI}$. The UE may perform a channel coding procedure 610 with RI 608. The UE may encode the RI 608 by polar code, Reed-Muller code, or some other code utilized for CSI. In some embodiments, the UE may encode the RI 608 by a different code format than the concatenated PMI-CQI 602. For example, the RI 608 may be encoded by Reed-Muller code, whereas the concatenated PMI-CQI 602 may be encoded by polar code. The channel coding of the RI 608 may result in encoded RI 612. The encoded RI 612 may include the encoded bits $q_0^{RI}$, $q_1^{RI}$ ..., $q_{O^{RI}-1}^{RI}$. In some embodiments, the coding rate for the RI 608 may be lower than a coding rate for the concatenated PMI-CQI 602.

The UE may then perform a multiplexing and interleaving operation 614 with the encoded RI 612 and the encoded PMI-CQI 606 in some embodiments. For example, the two sequences of encoded bits corresponding to the encoded RI 612 and the encoded PMI-CQI 606, respectively, may be multiplexed and interleaved before being mapped to resources for transmission. The multiplexing and interleaving of the encoded RI 612 and the PMI-CQI 606 may produce a concatenated CSI element. In some embodiments, the baseband circuitry of the UE may cause radio frequency (RF) circuitry (such as RF circuitry XT06 (FIG. 15)) of the UE to perform the multiplexing and interleaving. In other embodiments, the baseband circuitry of the UE may perform the multiplexing and interleaving. In some embodiments, each encoded bit of the encoded PMI-CQI 606 and the encoded RI 612 may be mapped to different PUCCH formats. For example, each encoded bit of the encoded PMI-CQI 606 may be mapped in a different PUCCH format from the encoded RI 612. In some embodiments, each encoded bit of the encoded PMI-CQI 606 and the encoded RI 612 may be mapped to different PUCCH symbols. For example, each encoded bit of the encoded PMI-CQI 606 may be mapped to a different PUCCH symbol from the encoded RI 612.

Figure 7:
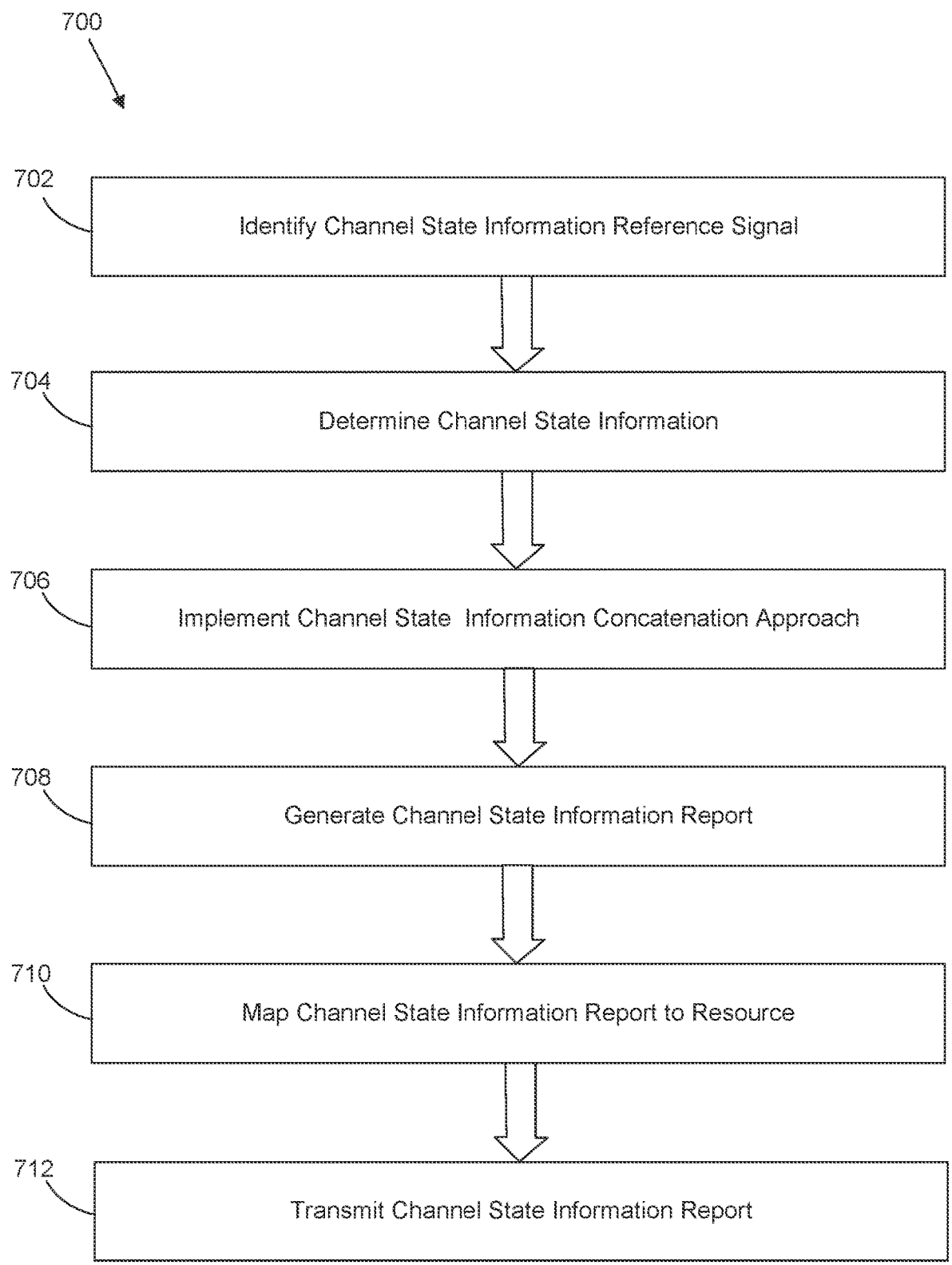
FIG. 7 illustrates a CSI report procedure, according to various embodiments.
Figure 14:
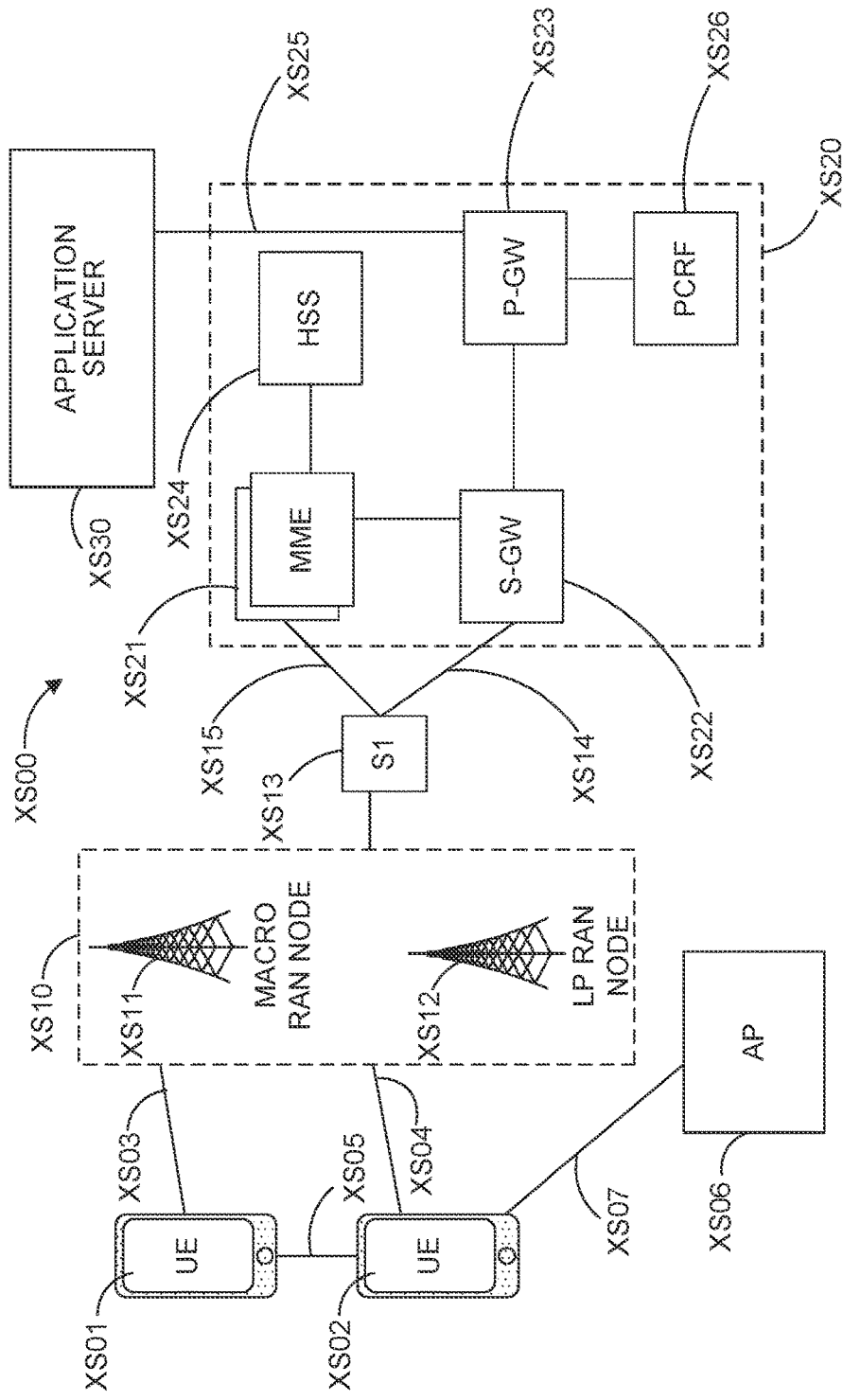
FIG. 14 illustrates an architecture of a system of a network in accordance with some embodiments.

FIG. 7 illustrates a CSI report procedure 700, according to various embodiments. The CSI report procedure 700 may be performed by a UE, such as the UE XS01 (FIG. 14) and the UE XS02 (FIG. 14).

In stage 702, the UE may identify a CSI-RS received from a base station. In response to identifying the CSI-RS, the procedure may proceed to stage 704.

In stage 704, the UE may determine CSI via channel estimation. In particular, the UE may measure channel properties associated with a communication link between the UE and the base station. For example, the UE may determine CSI for the communication link that includes an RI, a PMI, and a CQI.

In stage 706, the UE may implement a CSI concatenation approach with the RI, the PMI, and the CQI. In particular, the UE may implement one of the CSI concatenation approach 200 (FIG. 2), the CSI concatenation approach 400 (FIG. 4), the CSI concatenation approach 500 (FIG. 5), or the CSI concatenation approach 600 (FIG. 6). The implementation of the CSI concatenation approach may produce a concatenated CSI element for inclusion within a CSI report.

In stage 708, the UE may generate a CSI report for transmission to the base station. The CSI report may include the concatenated CSI element produced in stage 706.

In stage 710, the UE may map the CSI report to a resource or resources for transmission to the base station. The UE may map the CSI report to a single slot for transmission to the base station. For example, the UE may map the CSI report to a single slot of a PUCCH for reporting. In embodiments, a portion of the CSI report may be mapped to a different PUCCH symbol than another portion of the CSI report, as described in relation to the CSI concatenation approach 500 or the CSI concatenation approach 600. Further, a portion of the CSI report may be mapped to a different PUCCH format than another portion of the CSI report, as described in relation to the CSI concatenation approach 500 or the CSI concatenation approach 600.

In stage 712, the UE may transmit the CSI report to the base station on the mapped resource or resources.

Figure 8:
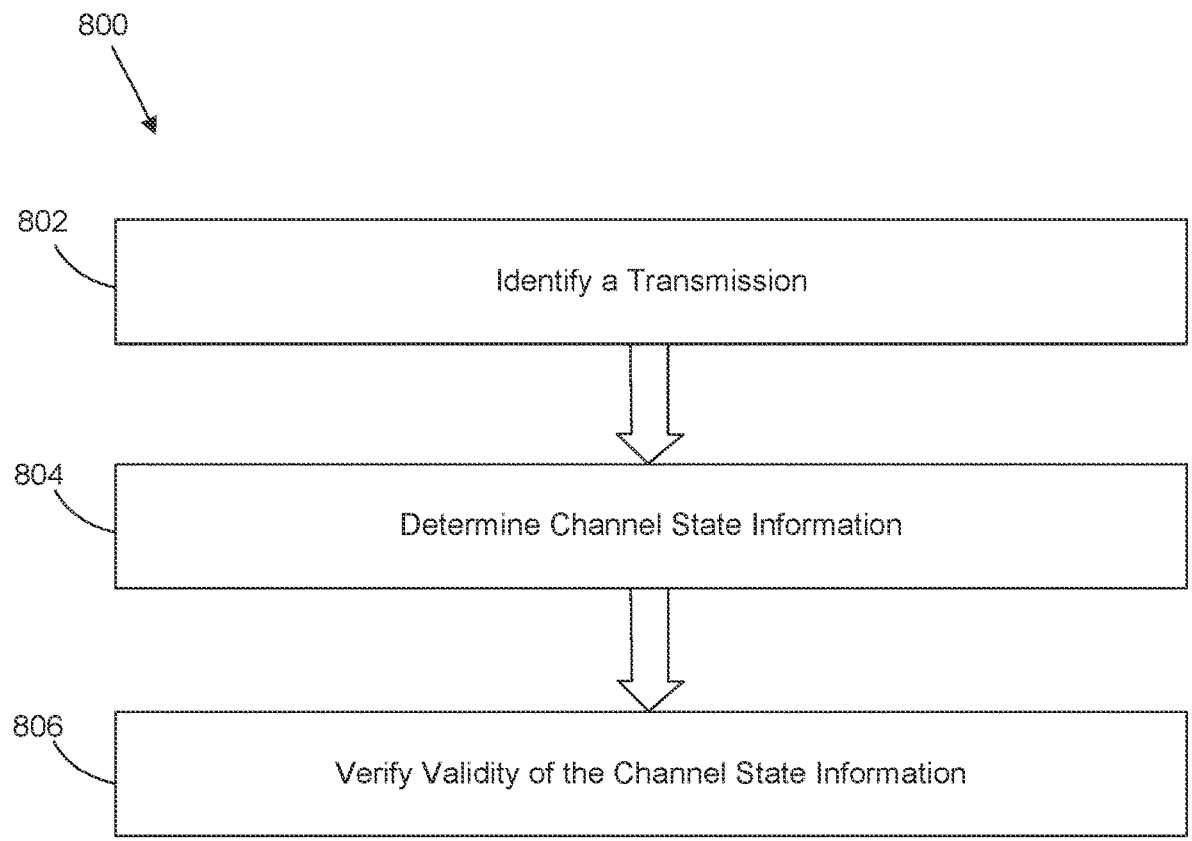
FIG. 8 illustrates a CSI determination procedure, according to various embodiments.

FIG. 8 illustrates a CSI determination procedure 800, according to various embodiments. The CSI determination procedure 800 may be performed by a base station, such as RAN Node XS11 (FIG. 14) and RAN Node XS12 (FIG. 14).

In stage 802, the base station may identify a transmission received from a UE. The transmission may include CSI, or some portion thereof. In some embodiments, the transmission may comprise a CSI report. The CSI report may include an RI, a PMI, and a CQI determined by the UE based on a CSI-RS transmitted by the base station.

In other embodiments, the transmission may comprise a demodulation reference signal (DMRS). A sequence of the DMRS may be configured based on an RI associated with CSI for the UE. In particular, the UE may have determined the RI based on a CSI-RS transmitted by the base station and configured the sequence of the DMRS based on the RI.

In stage 804, the base station may determine the channel state information. In embodiments where the transmission comprises a CSI report, the base station may assume certain bit sizes of the RI, the PMI, and the CQI. For example, the base station may assume the bit sizes of the RI, the PMI, and the CQI correspond to one of the rows illustrated in the table 100 (FIG. 1). The base station may assume bit sizes to correspond to a certain rank, such as a rank of 1. In some embodiments, the possible RI values may be limited to reduce the potential bit sizes of the RI, the PMI, and/or the CQI. The base station may then decode the CSI report based on the assumed bit sizes to determine values of the RI, the PMI, and the CQI.

In embodiments where the transmission comprises a DMRS, the base station may compare the sequence of the DMRS with a predefined DMRS sequence associated with a particular RI. In particular, the base station may have multiple predefined DMRS sequences stored in memory, where each of the predefined DMRS sequences correspond to a different RI value. The base station may select one of the multiple predefined DMRS sequences to compare with the sequence of the received DMRS to determine whether the received DMRS is for an RI value that corresponds to the one of the multiple predefined DMRS sequences.

In stage 806, the base station may verify the validity of the CSI. In embodiments where the transmission comprises a CSI report, the base station may identify one or more cyclic redundancy check (CRC) bits appended to the CSI report by the UE. The base station may compare the determined values of the RI, the PMI, and the CQI with the CRC bits to determine if the CSI has been correctly decoded. In particular, the base station may compare the decoded bits for the RI, the PMI, and the CQI with the CRC bits to determine if the assumed bit sizes of the RI, the PMI, and the CQI utilized for determining the CSI were the correct bit sizes. In response to determining that the comparison of the decoded bits for the RI, the PMI, and the CQI with the CRC bits results in a determination that the CSI is invalid (i.e., improper bit sizes of the RI, the PMI, and the CQI were assumed), the base station may repeat stage 804 and stage 806 with assumption of different bit sizes of the RI, the PMI, and the CQI until the comparison of the decoded bits for the RI, the PMI, and the CQI with the CRC bits results in a determination that the determined CSI is valid (i.e., proper bit sizes of the RI, the PMI, and the CQI were assumed).

In embodiments where the transmission comprises a DMRS, the base station may perform channel estimation based on the RI determined in stage 804 to determine a signal to interference and noise ratio (SINR) associated with the one of the multiple predefined DMRS sequences utilized in stage 804. The base station may further compare the sequence of the received DMRS with others of the multiple predefined DMRS sequences, and determine SINR for each of the others of the multiple predefined DMRS sequences. The base station may determine if the SINR for the RI determined in stage 804 is higher than the SINRs for each of the others of the multiple predefined DMRS sequences. If the base station determines that the SINR for the RI determined in stage 804 is lower than any of the SINRs for the others of the multiple predefined DMRS sequences, the base station may determine that the SINR for the RI determined in stage 804 is invalid. In response to determined that the SINR for the RI determined in stage 804 is invalid, the base station may identify the one of the others of the multiple predefined DMRS sequences with the highest SINR, and determine that the transmission is associated with the RI that corresponds to the predefined DMRS sequence with the highest SINR.

In some embodiments where the transmission comprises a DMRS, the base station may perform stage 804 for multiple, or all, of the predefined DMRS sequences before proceeding to stage 806. For example, the base station may compare the sequence of the received DMRS with each of the predefined DMRS sequences. In these embodiments, the base station may determine SINRs for each of the predefined DMRS sequences to determine SINRs associated with RIs corresponding to each of the predefined DMRS. The base station may then select the highest SINR out of the determined SINRs and determine that the valid RI associated with the received DMRS is the RI associated with the highest SINR.

In some embodiments, the CSI determination procedure 800 where the transmission comprises a DMRS may be utilized in combination with the CSI concatenation approach 200 (FIG. 2), the CSI concatenation approach 400 (FIG. 4), the CSI concatenation approach 500 (FIG. 5), the CSI concatenation approach 600 (FIG. 6), the CSI determination procedure 800 where the transmission comprises a CSI report, or some combination thereof.

Further, in some embodiments, a maximum rank supported by the base station and/or the UE may determine which of the CSI concatenation approach 200, the CSI concatenation approach 400, the CSI concatenation approach 500, the CSI concatenation approach 600, the CSI determination procedure 800 with the transmission comprising a DMRS, or the CSI determination procedure 800 with the transmission comprising a CSI report is implemented. For example, a threshold rank, K, may be predefined or configured by higher layer signaling. If the maximum supported rank is greater than the threshold rank, one of the CSI concatenation approach 200, the CSI concatenation approach 400, the CSI concatenation approach 500, the CSI concatenation approach 600, or the CSI determination procedure 800 with the transmission comprising a CSI report may be implemented. If the maximum supported rank is equal to or less than the threshold rank, the CSI determination procedure 800 with the transmission comprising the DMRS may be implemented.

Figure 9:
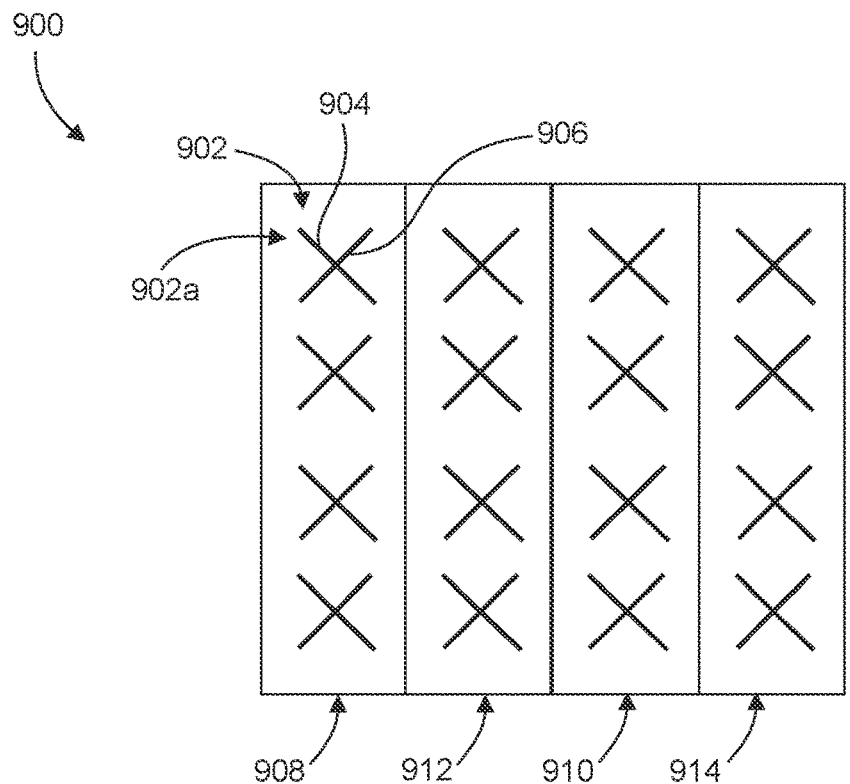
FIG. 9 illustrates an example antenna port arrangement, according to various embodiments.

FIG. 9 illustrates an example antenna port arrangement 900, according to various embodiments. The antenna port arrangement 900, the antenna port arrangement 1000 (FIG. 10), the antenna port arrangement 1100 (FIG. 11), the procedure 1200 (FIG. 12) of CSI calculation, and the procedure 1300 (FIG. 13) may relate to multiple-input, multiple-output (MIMO) communication systems, such as NR MIMO communication systems.

MIMO systems may rely on a plurality of transmission (Tx) and reception (Rx) antennas to provide spatial diversity, multiplexing, and array gains in the downlink (DL) and uplink (UL) channels. In the DL, the Tx can improve the performance by using CSI about the DL channel observed by the Rx. The CSI can be obtained by the Tx from the Rx from estimation of the UL channel and by using channel reciprocity of the wireless channel, and/or from quantized feedback measured by the Rx.

The quantized form of CSI feedback may be more general and can be used for both Frequency Division Duplex (FDD) and Time Division Duplex (TDD) systems. The quantized CSI may include the PMI to assist beamforming or precoding selection at the Tx antennas of the base station. The set of possible PMIs may be denoted as a codebook. For different possible deployments of NR, the codebook may be designed to provide reasonable performance in all possible serving directions of the total radiated power (TRP).

CSI-RS may be reference signals introduced to support channel measurement for CSI calculation. For NR, CSI-RS may support 2, 4, 8, 12, 16, 24, and 32 antenna ports. The density of CSI-RS may be 1 resource element per physical resource block (PRB) pair per CSI-RS antenna port. CSI-RS can be located in every PRB or every second PRB or every third PRB. CSI-RS can be aperiodically, semi-persistently, or periodically transmitted. The minimum periodicity of CSI-RS transmission may be 5 subframes or 5 slots. The parameters of CSI-RS may be configured to the user equipment (UE) using higher layer signaling (e.g., radio resource control (RRC) signaling and the like) and CSI-RS presence can be dynamically indicated to the UE.

To reduce UE complexity, different UEs may be capable of CSI processing for a different number of antenna ports. For example, UE complexity may increase as larger numbers of antenna ports are to be scanned by the UE. In particular, as the number of antenna ports are increased, a number of bits for CSI reporting and/or a number of decoding vectors/matrices may be increased, leading to higher UE complexity. Accordingly, some UEs may be capable of supporting up to a certain number of antenna ports, such as 8 or 16 antenna ports, while other UEs may support a greater number of antenna ports. As a result, a base station may transmit multiple CSI-RS signals with a different number of antenna ports. For example, the base station may transmit one CSI-RS on all antenna ports of the base station for more advanced UEs that support a greater amount of antenna ports, and may transmit another CSI-RS on a portion of the antenna ports for less advanced UEs that support a lesser amount of antenna ports. To reduce the overhead, a single CSI-RS signal can be transmitted by the base station and a UE capable of a smaller number of antenna ports may use antenna port subset for channel measurements.

According to various embodiments, separate configurations of antenna ports, N, for CSI-RS signal(s) and antenna ports, K, for codebook(s) may be utilized, where N and K are numbers and N is greater than or equal to K (e.g., N>=K). According to various embodiments, a UE may use a subset of K antenna ports for channel measurements using a codebook with antenna port K. For Physical Downlink Shared Channel (PDSCH) resource element (RE) mapping, the UE may assume a CSI-RS is transmitted on N antenna ports.

The antenna port arrangement 900 illustrates an arrangement of an antenna array where a UE (such as UE XS01 (FIG. 14) and UE XS02 (FIG. 14)) utilizes a subset of antenna ports for calculating CSI. In particular, a base station (such as RAN Node XS11 (FIG. 14) and RAN Node XS12 (FIG. 14)) that communicates with the UE may include one or more antenna elements 902. In the illustrated embodiment, the base station includes sixteen antenna elements 902, where each antenna element 902 is indicated by an 'X' in the antenna port arrangement 900. Further, each antenna element 902 may provide two antenna ports, where each antenna port is indicated by a line in the 'X' of the antenna elements 902. For example, a first antenna element 902a may provide a first antenna port 904 and a second antenna port 906. The antenna elements 902 may support a cross-polarized antenna configuration, where each antenna element 902 provides two antenna ports having polarization slants of plus or minus 45 degrees, respectively. The total number of antenna ports in the antenna port arrangement 900 illustrated is 32 antenna ports, where the total number of antenna ports provided by a base station may be referred to as 'N' antenna ports herein.

UEs may be capable of CSI processing for a maximum number of antenna ports that is less than a total number of antenna ports provided by the base station. In the illustrated embodiment, the UE may be capable of CSI processing for a maximum of 16 antenna ports. Accordingly, the UE may utilize a subset of the antenna ports provided by the base station for CSI processing to calculate CSI for the UE. In particular, the UE may perform CSI calculation using a codebook having a number of parameters equal to the number of antenna ports within the subset, where the UE may perform the CSI calculation on the subset. In the illustrated embodiment, the UE may utilize a subset of 16 antenna ports to calculate CSI for the UE.

A subset of antenna ports to be utilized by a UE may be predefined or configured by higher layer signaling. In the illustrated embodiment, the UE may be configured to utilize a first portion of a first half of the antenna ports (i.e., antenna ports 0, . . . , K/2-1, where K is the number of antenna ports within the subset) and a first portion of a second half of the antenna ports (i.e., antenna ports N/2, . . . , N/2+K/2-1, wherein N is a total number of the antenna ports of the antenna port arrangement 900) to calculate CSI for the UE. The size of the portions may be equal to half of the number of antenna ports that the UE is capable of utilizing for CSI processing. In particular, the UE may utilize a first portion 908 and a second portion 910 of the antenna ports to calculate the CSI. For example, the UE may measure CSI-RS transmitted by the antenna ports within the first portion 908 and the second portion 910 to calculate the CSI for the UE.

In other embodiments, the UE may be configured to utilize a second portion of the first half of the antenna ports and a second portion of the second half of the antenna ports to calculate the CSI for the UE. In these embodiments, the UE may utilize a third portion 912 and a fourth portion 914 of the antenna ports to calculate the CSI. For example, the UE may measure CSI-RS transmitted by the antenna ports within the third portion 912 and the fourth portion 914 to calculate the CSI for the UE.

Figure 10:
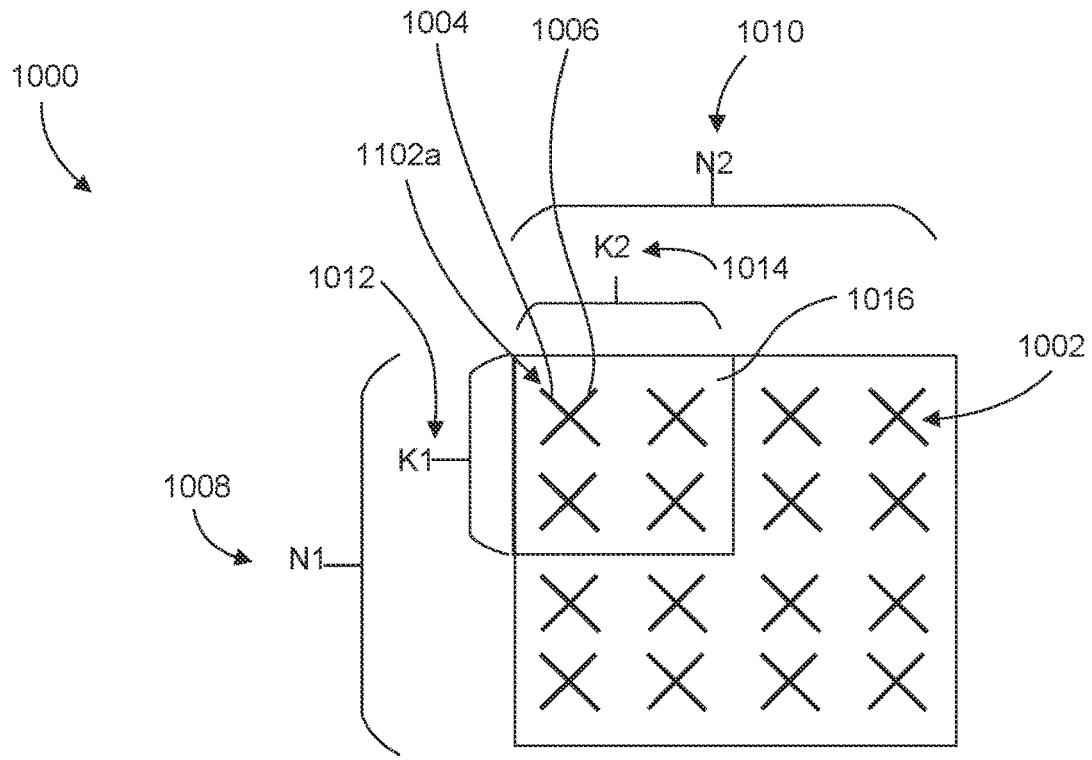
FIG. 10 illustrates another example antenna port arrangement, according to various embodiments.

FIG. 10 illustrates another example antenna port arrangement 1000, according to various embodiments. The antenna port arrangement 1000 illustrates an arrangement of an antenna array where a UE (such as UE XS01 (FIG. 14) and UE XS02 (FIG. 14)) utilizes a subset of antenna ports for calculating CSI. In particular, a base station (such as RAN Node XS11 (FIG. 14) and RAN Node XS12 (FIG. 14)) that communicates with the UE may include one or more antenna elements 1002. In the illustrated embodiment, the base station includes sixteen antenna elements 1002, where each antenna element 1002 is indicated by an 'X' in the antenna port arrangement 1000. Further, each antenna element 1002 may provide two antenna ports, where each antenna port is indicated by a line in the 'X' of the antenna elements 1002. For example, a first antenna element 1002a may provide a first antenna port 1004 and a second antenna port 1006. The antenna elements 1002 may support a cross-polarized antenna configuration, where each antenna element 1002 provides two antenna ports having polarization slants of plus or minus 45 degrees, respectively. The total number of antenna ports in the antenna port arrangement 1000 illustrated is 32 antenna ports, where the total number of antenna ports provided by a base station may be referred to as 'N' antenna ports herein.

In the illustrated embodiment, the base station may configure the UE with which subset the UE is to utilize for calculating the CSI for the UE. In particular, the UE may be configured with parameter N1 1008 and parameter N2 1010. Parameter N1 1008 may indicate a number of the antenna elements 1002 in a first dimension of the antenna port arrangement 1000 and parameter N2 1010 may indicate a number of the antenna elements 1002 in a second dimension. In other embodiments, the parameter N1 1008 may indicate a number of antenna ports having a certain polarization in the first dimension and parameter N2 1010 may indicate a number of antenna ports having the certain polarization in the second dimension to be utilized for calculating the CSI. Accordingly, a total number of antenna ports in the antenna port arrangement 1000 may be defined as $N=P*N1*N2$, where N is the total number of antenna ports and P is the number of polarizations of the antenna array. For the illustrated embodiment, the number of the antenna ports may defined as $N=2*4*4$, where N is equal to 32.

The base station may further configure the UE with parameter K1 1012 and parameter K2 1014. Parameter K1 1012 may indicate a number of the antenna elements 1002 in the first dimension to define a subset of the antenna ports to be utilized by the UE for calculating the CSI and parameter K2 1014 may indicate a number of the antenna elements 1002 in the second dimension to define a subset of the antenna ports to be utilized for calculating the CSI. In other embodiments, the parameter K1 1012 may indicate a number of antenna ports having a certain polarization in the first dimension to be utilized by the UE for calculating the CSI and parameter K2 1014 may indicate a number of antenna ports having the certain polarization in the second dimension to be utilized for calculating the CSI. Accordingly, the number of antenna ports within the subset may be defined as $K=P*K1*K2$, where K is the number of antenna ports within the subset and P is the number of polarizations of the antenna array. For the illustrated embodiment, the number of antenna ports within the subset may be defined as $K=2*2*2$, where K is equal to 8.

For example, the base station may configure the UE with the parameter N1 1008 with a value of 4 and the parameter N2 1010 with a value of 4. In particular, the parameter N1 1008 indicates that there are 4 antenna elements 1002 in a vertical dimension of the antenna array and parameter N2 1010 indicates that there are 4 antenna elements 1002 in a horizontal dimension of the antenna array. Further, the base station may configure the UE with the parameter K1 1012 with a value of 2 and the parameter K2 1014 with a value of 2. Accordingly, the base station may configure the UE with the subset 1016 of the antenna ports to be utilized for calculating the CSI. Accordingly, the UE may perform channel estimation based on CSI-RS transmitted on the antenna ports within the subset 1016 and calculate the CSI based on the results of the channel estimation.

Figure 11:
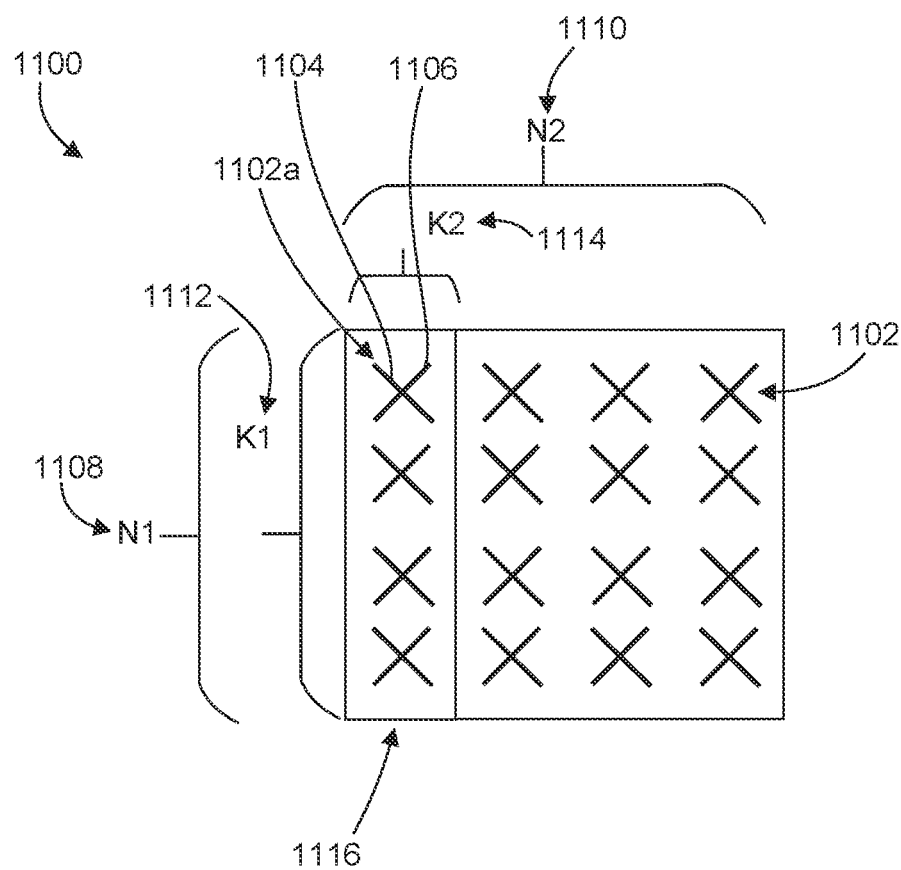
FIG. 11 illustrates another example antenna port arrangement, according to various embodiments.

FIG. 11 illustrates another example antenna port arrangement 1100, according to various embodiments. The antenna port arrangement 1100 illustrates an arrangement of an antenna array where a UE (such as UE XS01 (FIG. 14) and UE XS02 (FIG. 14)) utilizes a subset of antenna ports for calculating CSI. In particular, a base station (such as RAN Node XS11 (FIG. 14) and RAN Node XS12 (FIG. 14)) that communicates with the UE may include one or more antenna elements 1102. In the illustrated embodiment, the base station includes sixteen antenna elements 1102, where each antenna element 1102 is indicated by an 'X' in the antenna port arrangement 1100. Further, each antenna element 1102 may provide two antenna ports, where each antenna port is indicated by a line in the 'X' of the antenna elements 1102. For example, a first antenna element 1102a may provide a first antenna port 1104 and a second antenna port 1106. The antenna elements 1102 may support a cross-polarized antenna configuration, where each antenna element 1102 provides two antenna ports having polarization slants of plus or minus 45 degrees, respectively. The total number of antenna ports in the antenna port arrangement 1100 illustrated is 32 antenna ports, where the total number of antenna ports provided by a base station may be referred to as 'N' antenna ports herein.

In the illustrated embodiment, the base station may configure the UE with which subset the UE is to utilize for calculating the CSI for the UE. In particular, the UE may be configured with parameter N1 1108 and parameter N2 1110. Parameter N1 1108 may indicate a number of the antenna elements 1102 in a first dimension of the antenna port arrangement 1100 and parameter N2 1110 may indicate a number of the antenna elements 1102 in a second dimension. In other embodiments, the parameter N1 1108 may indicate a number of antenna ports having a certain polarization in the first dimension and parameter N2 1110 may indicate a number of antenna ports having the certain polarization in the second dimension to be utilized for calculating the CSI. Accordingly, a total number of antenna ports in the antenna port arrangement 1100 may be defined as N=P*N1*N2, where N is the total number of antenna ports and P is the number of polarizations of the antenna array. For the illustrated embodiment, the number of the antenna ports may defined as N=2*4*4, where N is equal to 32.

The base station may further configure the UE with parameter K1 1112 and parameter K2 1114. Parameter K1 1112 may indicate a number of the antenna elements 1102 in the first dimension to define a subset of the antenna ports to be utilized by the UE for calculating the CSI and parameter K2 1114 may indicate a number of the antenna elements 1102 in the second dimension to define a subset of the antenna ports to be utilized for calculating the CSI. In other embodiments, the parameter K1 1112 may indicate a number of antenna ports having a certain polarization in the first dimension to be utilized by the UE for calculating the CSI and parameter K2 1114 may indicate a number of antenna ports having the certain polarization in the second dimension to be utilized for calculating the CSI. Accordingly, the number of antenna ports within the subset may be defined as K=P*K1*K2, where K is the number of antenna ports within the subset and P is the number of polarizations of the antenna array. For the illustrated embodiment, the number of antenna ports within the subset may be defined as K=2*4*1, where K is equal to 8.

For example, the base station may configure the UE with the parameter N1 1108 with a value of 4 and the parameter N2 1110 with a value of 4. In particular, the parameter N1 1108 indicates that there are 4 antenna elements 1102 in a vertical dimension of the antenna array and parameter N2 1110 indicates that there are 4 antenna elements 1102 in a horizontal dimension of the antenna array. Further, the base station may configure the UE with the parameter K1 1112 with a value of 4 and the parameter K2 1114 with a value of 1. Accordingly, the base station may configure the UE with the subset 1116 of the antenna ports to be utilized for calculating the CSI. Accordingly, the UE may perform channel estimation based on CSI-RS transmitted on the antenna ports within the subset 1116 and calculate the CSI based on the results of the channel estimation.

Figure 12:
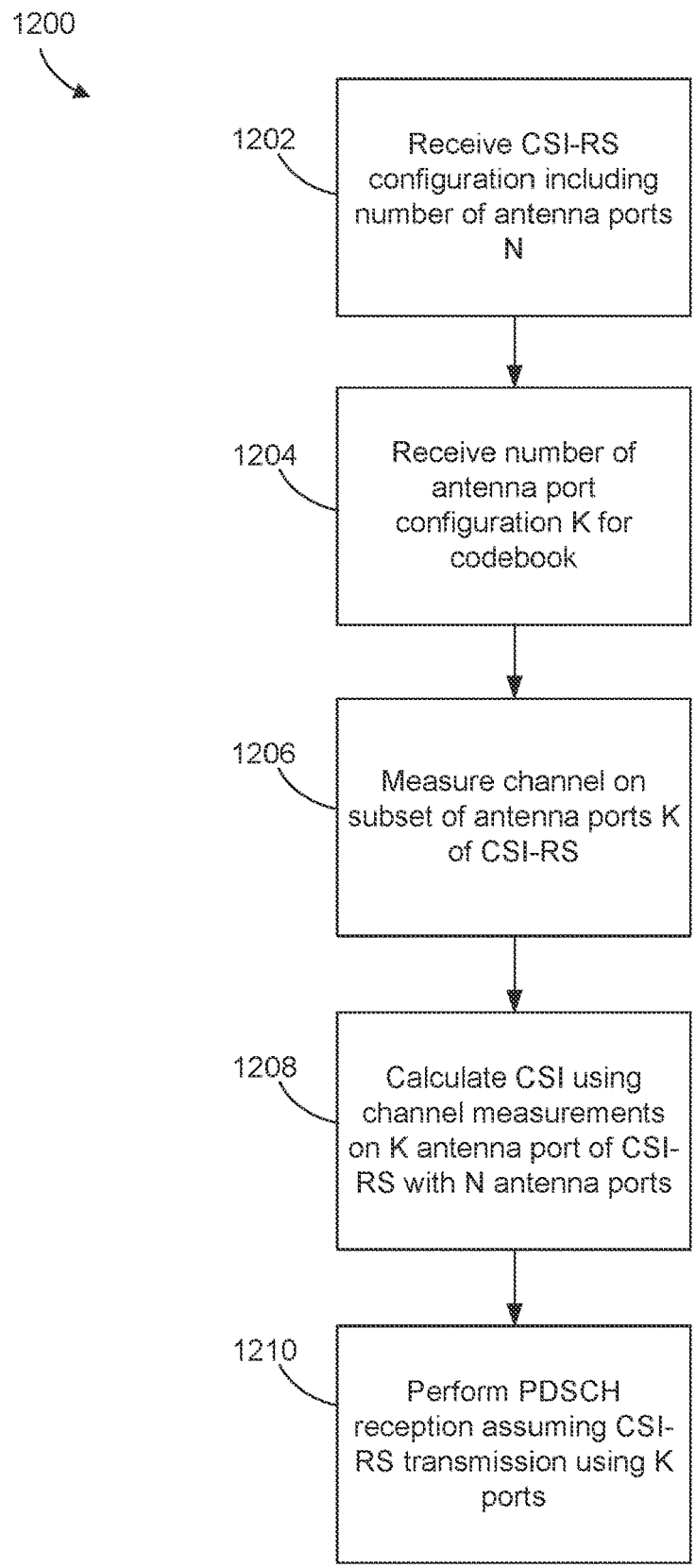
FIG. 12 illustrates an example procedure of CSI calculation, according to various embodiments.

FIG. 12 illustrates an example procedure 1200 of CSI calculation, according to various embodiments. In particular, the procedure 1200 may be performed by a UE, such as the UE XS01 and the UE XS02.

In stage 1202, the UE may receive a CSI-RS configuration including a number of antenna ports N. In particular, the UE may be configured by a base station for a number of antenna ports N. In some embodiments, the base station may indicate a number of antenna elements in each dimension of an antenna array or a number of antenna ports of a certain polarization in each dimension of the antenna array.

In stage 1204, the UE may identify an indication of a number of antenna port configuration K for a codebook. In particular, the UE may be configured by the base station with a subset of the antenna ports K to be utilized by the UE for CSI calculation. In some embodiments, the base station may indicate a number of elements in each dimension of the antenna array or a number of antenna ports of a certain polarization in each dimension of the antenna array. In embodiments where the subset K is predefined, stage 1204 may include retrieving an indication from a memory of the UE of the subset of antenna ports K to be utilized for CSI calculation.

In stage 1206, the UE may measure the channel using the subset of antenna ports K of the CSI-RS. In particular, the UE may perform channel estimation with the CSI-RS transmitted on the subset of the antenna ports K.

In stage 1208, the UE may calculate CSI using the channel measurements on the subset of antenna ports K of CSI-RS with N antenna ports. In particular, the UE may calculate the CSI for the UE based on the channel measurements performed in stage 1206. Further, the UE may determine a codeword from the codebook based on the CSI. The UE may further transmit a CSI report to the base station that indicates the calculated CSI. The CSI report may include an indication of the codeword, where the base station may utilize the codeword to determine precoding to be transmitted to the UE via a physical downlink shared channel (PDSCH).

In stage 1210, the UE may perform PDSCH reception assuming CSI-RS transmission using the subset of antenna ports K. For example, the UE may identify data on the PDSCH, where the data is communicated on the subset of antenna ports K by the base station. The data received may be precoded based on the codeword transmitted to the base station by the UE in the CSI report.

Figure 13:
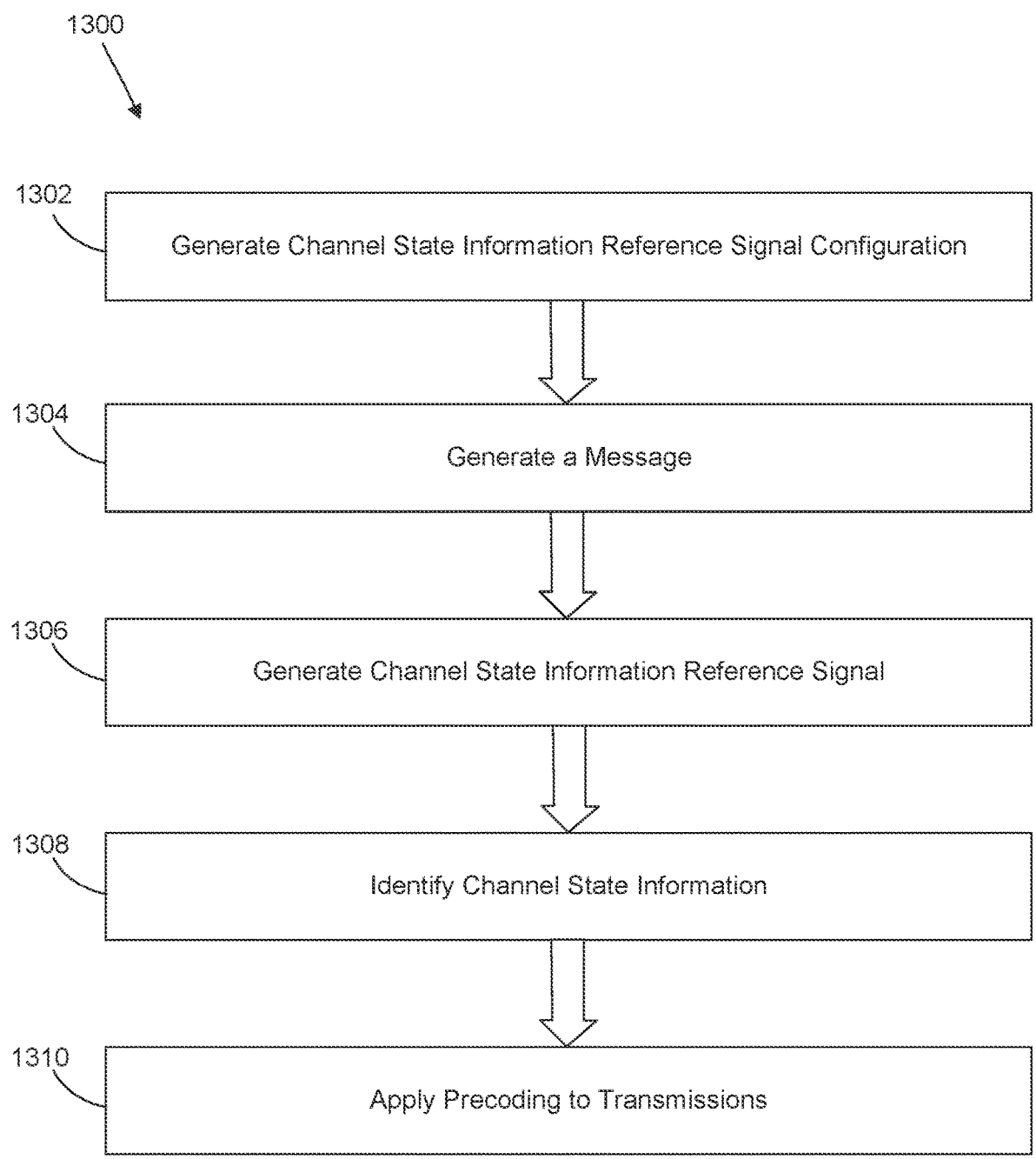
FIG. 13 illustrates a subset configuration procedure, according to various embodiments.

FIG. 13 illustrates a subset configuration procedure 1300, according to various embodiments. In particular, the subset configuration procedure 1300 may be performed by a base station, such as the RAN Node XS11 (FIG. 14) and the RAN Node XS12 (FIG. 14).

In stage 1302, the base station may generate a CSI-RS configuration. For example, the base station may generate the CSI-RS configuration for a UE and may configure the UE with the CSI-RS configuration. The CSI-RS may include an indication of a number of antenna ports N provided by the base station. In particular, the antenna ports may be provided by an antenna array of the base station.

In stage 1304, the base station may generate a message for transmission to the UE. The message may include a subset configuration for configuring the UE with a subset of the antenna ports K to be utilized by the UE for calculating CSI. In particular, the message may include an indication of the subset of the antenna ports K to be utilized by the UE for calculating the CSI. The indication of the subset may include an indication of a number of antenna ports in a first dimension and a number of antenna ports in a second dimension that define the subset K. In some embodiments, the indication of the subset may include an indication of a number of antenna elements in a first dimension and a number of antenna elements in a second dimension that defined the subset K. The base station may utilize the message to configure the UE with the subset.

In stage 1306, the base station may generate a CSI-RS. The base station may transmit the CSI-RS to the UE on the subset of the antenna ports K. The UE may utilize the CSI-RS for calculating the CSI.

In stage 1308, the base station may identify CSI received from the UE. The CSI may include a PMI, which may be identified by the base station. The base station may determine precoding to be performed for the UE based on the PMI.

In stage 1310, the base station may apply the precoding to transmissions to be provided to the UE by the base station. For example, the base station may apply the precoding determined in stage 1308 to data to be transmitted to the UE via the PDSCH. The precoded data may be transmitted by the base station on the subset of antenna ports K to the UE.

FIG. 14 illustrates an architecture of a system XS00 of a network in accordance with some embodiments. The system XS00 is shown to include a user equipment (UE) XS01 and a UE XS02. The UEs XS01 and XS02 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs XS01 and XS02 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs XS01 and XS02 may be configured to connect, e.g., communicatively couple, with a radio access network (RAN) XS10—the RAN XS10 may be, for example, an Evolved Universal Mobile Telecommunications System (UMTS) Terrestrial Radio Access Network (E-UTRAN), a NextGen RAN (NG RAN), or some other type of RAN. The UEs XS01 and XS02 utilize connections XS03 and XS04, respectively, each of which comprises a physical communications interface or layer (discussed in further detail below); in this example, the connections XS03 and XS04 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs XS01 and XS02 may further directly exchange communication data via a ProSe interface XS05. The ProSe interface XS05 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE XS02 is shown to be configured to access an access point (AP) XS06 via connection XS07. The connection XS07 can comprise a local wireless connection, such as a connection consistent with any IEEE 802.11 protocol, wherein the AP XS06 would comprise a wireless fidelity (WiFi®) router. In this example, the AP XS06 is shown to be connected to the Internet without connecting to the core network of the wireless system (described in further detail below).

The RAN XS10 can include one or more access nodes that enable the connections XS03 and XS04. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN XSIO may include one or more RAN nodes for providing macrocells, e.g., macro RAN node XS11, and one or more RAN nodes for providing femtocells or picocells (e.g., cells having smaller coverage areas, smaller user capacity, or higher bandwidth compared to macrocells), e.g., low power (LP) RAN node XS12.

Any of the RAN nodes XS11 and XS12 can terminate the air interface protocol and can be the first point of contact for the UEs XS01 and XS02. In some embodiments, any of the RAN nodes XS11 and XS12 can fulfill various logical functions for the RAN XS10 including, but not limited to, radio network controller (RNC) functions such as radio bearer management, uplink and downlink dynamic radio resource management and data packet scheduling, and mobility management.

In accordance with some embodiments, the UEs XS01 and XS02 can be configured to communicate using Orthogonal Frequency-Division Multiplexing (OFDM) communication signals with each other or with any of the RAN nodes XS11 and XS12 over a multicarrier communication channel in accordance with various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes XS11 and XS12 to the UEs XS01 and XS02, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs XS01 and XS02. The physical downlink control channel (PDCCH) may carry information about the transport format and resource allocations related to the PDSCH channel, among other things. It may also inform the UEs XS01 and XS02 about the transport format, resource allocation, and H-ARQ (Hybrid Automatic Repeat Request) information related to the uplink shared channel. Typically, downlink scheduling (assigning control and shared channel resource blocks to the UE XS01 and XS02 within a cell) may be performed at any of the RAN nodes XS11 and XS12 based on channel quality information fed back from any of the UEs XS01 and XS02. The downlink resource assignment information may be sent on the PDCCH used for (e.g., assigned to) each of the UEs XS01 and XS02.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as enhanced resource element groups (EREGs). An ECCE may have other numbers of EREGs in some situations.

The RAN XS10 is shown to be communicatively coupled to a core network (CN) XS20—via an S1 interface XS13. In embodiments, the CN XS20 may be an evolved packet core (EPC) network, a NextGen Packet Core (NPC) network, or some other type of CN. In this embodiment the S1 interface XS13 is split into two parts: the S1-U interface XS14, which carries traffic data between the RAN nodes XS11 and XS12 and the serving gateway (S-GW) XS22, and the S1-mobility management entity (MME) interface XS15, which is a signaling interface between the RAN nodes XS11 and XS12 and MiMEs XS21.

In this embodiment, the CN XS20 comprises the MMEs XS21, the S-GW XS22, the Packet Data Network (PDN) Gateway (P-GW) XS23, and a home subscriber server (HSS) XS24. The MMEs XS21 may be similar in function to the control plane of legacy Serving General Packet Radio Service (GPRS) Support Nodes (SGSN). The MMEs XS21 may manage mobility aspects in access such as gateway selection and tracking area list management. The HSS XS24 may comprise a database for network users, including subscription-related information to support the network entities' handling of communication sessions. The CN XS20 may comprise one or several HSSs XS24, depending on the number of mobile subscribers, on the capacity of the equipment, on the organization of the network, etc. For example, the HSS XS24 can provide support for routing/roaming, authentication, authorization, naming/addressing resolution, location dependencies, etc.

The S-GW XS22 may terminate the S1 interface XS13 towards the RAN XS10, and routes data packets between the RAN XS10 and the CN XS20. In addition, the S-GW XS22 may be a local mobility anchor point for inter-RAN node handovers and also may provide an anchor for inter-3GPP mobility. Other responsibilities may include lawful intercept, charging, and some policy enforcement.

The P-GW XS23 may terminate an SGi interface toward a PDN. The P-GW XS23 may route data packets between the EPC network XS23 and external networks such as a network including the application server XS30 (alternatively referred to as application function (AF)) via an Internet Protocol (IP) interface XS25. Generally, the application server XS30 may be an element offering applications that use IP bearer resources with the core network (e.g., UMTS Packet Services (PS) domain, LTE PS data services, etc.). In this embodiment, the P-GW XS23 is shown to be communicatively coupled to an application server XS30 via an IP communications interface XS25. The application server XS30 can also be configured to support one or more communication services (e.g., Voice-over-Internet Protocol (VoIP) sessions, PTT sessions, group communication sessions, social networking services, etc.) for the UEs XS01 and XS02 via the CN XS20.

The P-GW XS23 may further be a node for policy enforcement and charging data collection. Policy and Charging Enforcement Function (PCRF) XS26 is the policy and charging control element of the CN XS20. In a non-roaming scenario, there may be a single PCRF in the Home Public Land Mobile Nenvork (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF XS26 may be communicatively coupled to the application server XS30 via the P-GW XS23. The application server XS30 may signal the PCRF XS26 to indicate a new service flow and select the appropriate Quality of Service (QoS) and charging parameters. The PCRF XS26 may provision this rule into a Policy and Charging Enforcement Function (PCEF) (not shown) with the appropriate traffic flow template (TFT) and QoS class of identifier (QCI), which commences the QoS and charging as specified by the application server XS30.

Figure 15:
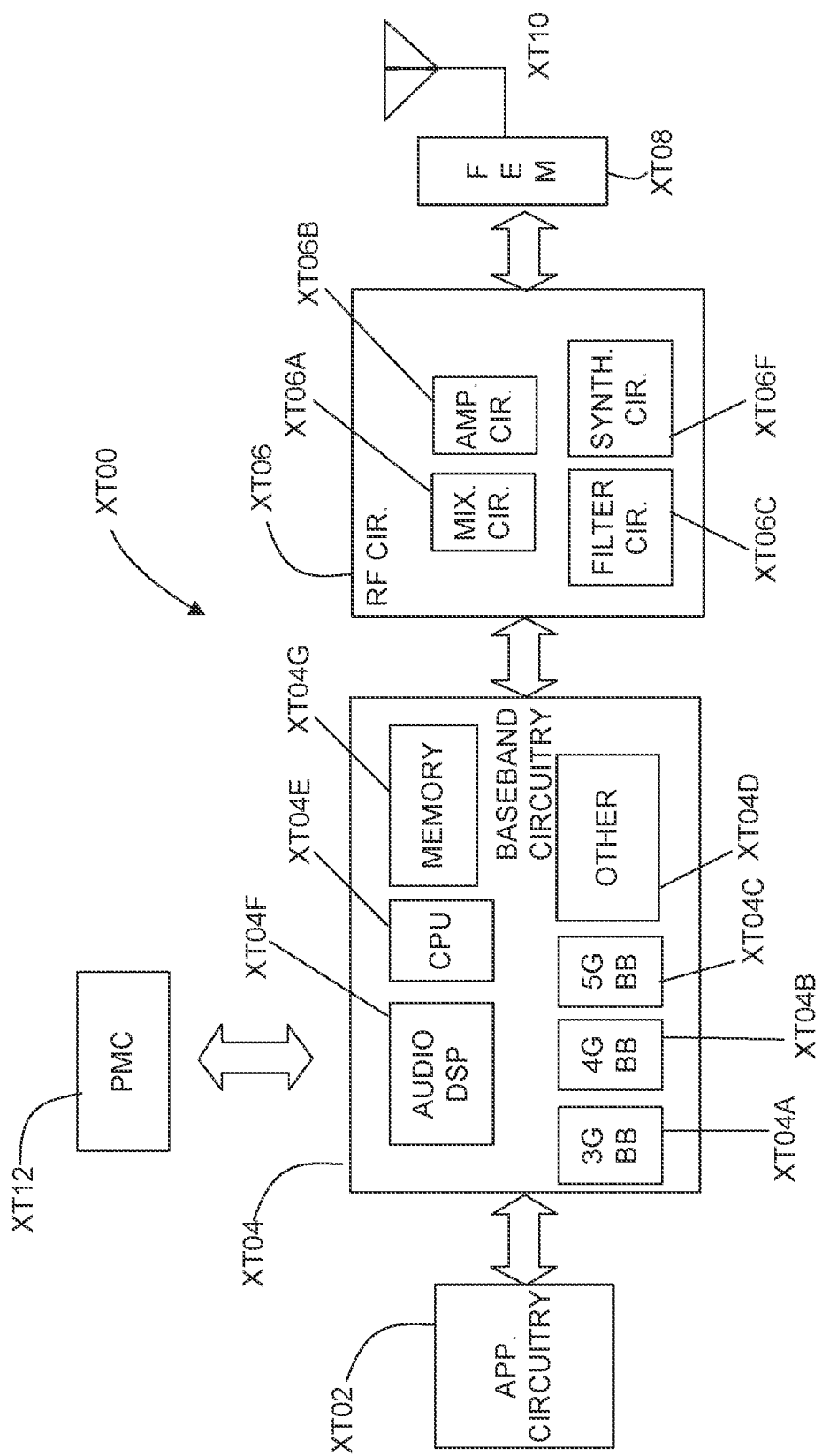
FIG. 15 illustrates example components of a device in accordance with some embodiments.

FIG. 15 illustrates example components of a device XT00 in accordance with some embodiments. In some embodiments, the device XT00 may include application circuitry XT02, baseband circuitry XT04, Radio Frequency (RF) circuitry XT06, front-end module (FEM) circuitry XT08, one or more antennas XT10, and power management circuitry (PMC) XT12 coupled together at least as shown. The components of the illustrated device XT00 may be included in a UE or a RAN node. In some embodiments, the device XT00 may include less elements (e.g., a RAN node may not utilize application circuitry XT02, and instead include a processor/controller to process IP data received from an EPC). In some embodiments, the device XT00 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry XT02 may include one or more application processors. For example, the application circuitry XT02 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device XT00. In some embodiments, processors of application circuitry XT02 may process IP data packets received from an EPC.

The baseband circuitry XT04 may include circuitry such as, but not limited to, one or more single-core or multi-core processors. The baseband circuitry XT04 may include one or more baseband processors or control logic to process baseband signals received from a receive signal path of the RF circuitry XT06 and to generate baseband signals for a transmit signal path of the RF circuitry XT06. Baseband processing circuitry XT04 may interface with the application circuitry XT02 for generation and processing of the baseband signals and for controlling operations of the RF circuitry XT06. For example, in some embodiments, the baseband circuitry XT04 may include a third generation (3G) baseband processor XT04A, a fourth generation (4G) baseband processor XT04B, a fifth generation (5G) baseband processor XT04C, or other baseband processor(s) XT04D for other existing generations, generations in development or to be developed in the future (e.g., second generation (2G), sixth generation (6G), etc.). The baseband circuitry XT04 (e.g., one or more of baseband processors XT04A-D) may handle various radio control functions that enable communication with one or more radio networks via the RF circuitry XT06. In other embodiments, some or all of the functionality of baseband processors XT04A-D may be included in modules stored in the memory XT04G and executed via a Central Processing Unit (CPU) XT04E. The radio control functions may include, but are not limited to, signal modulation/demodulation, encoding/decoding, radio frequency shifting, etc. In some embodiments, modulation/demodulation circuitry of the baseband circuitry XT04 may include Fast-Fourier Transform (FFT), precoding, or constellation mapping/demapping functionality. In some embodiments, encoding/decoding circuitry of the baseband circuitry XT04 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry XT04 may include one or more audio digital signal processor(s) (DSP) XT04F. The audio DSP(s) XT04F may include elements for compression/decompression and echo cancellation and may include other suitable processing elements in other embodiments. Components of the baseband circuitry XT04 may be suitably combined in a single chip, a single chipset, or disposed on a same circuit board in some embodiments. In some embodiments, some or all of the constituent components of the baseband circuitry XT04 and the application circuitry XT02 may be implemented together such as, for example, on a system on a chip (SOC).

In some embodiments, the baseband circuitry XT04 may provide for communication compatible with one or more radio technologies. For example, in some embodiments, the baseband circuitry XT04 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry XT04 is configured to support radio communications of more than one wireless protocol may be referred to as multi-mode baseband circuitry.

RF circuitry XT06 may enable communication with wireless networks using modulated electromagnetic radiation through a non-solid medium. In various embodiments, the RF circuitry XT06 may include switches, filters, amplifiers, etc. to facilitate the communication with the wireless network. RF circuitry XT06 may include a receive signal path which may include circuitry to down-convert RF signals received from the FEM circuitry XT08 and provide baseband signals to the baseband circuitry XT04. RF circuitry XT06 may also include a transmit signal path which may include circuitry to up-convert baseband signals provided by the baseband circuitry XT04 and provide RF output signals to the FEM circuitry XT08 for transmission.

In some embodiments, the receive signal path of the RF circuitry XT06 may include mixer circuitry XT06*a*, amplifier circuitry XT06*b* and filter circuitry XT06*c*. In some embodiments, the transmit signal path of the RF circuitry XT06 may include filter circuitry XT06*c* and mixer circuitry XT06*a*. RF circuitry XT06 may also include synthesizer circuitry XT06*d* for synthesizing a frequency for use by the mixer circuitry XT06*a* of the receive signal path and the transmit signal path. In some embodiments, the mixer circuitry XT06*a* of the receive signal path may be configured to down-convert RF signals received from the FEM circuitry XT08 based on the synthesized frequency provided by synthesizer circuitry XT06*d*. The amplifier circuitry XT06*b* may be configured to amplify the down-converted signals and the filter circuitry XT06*c* may be a low-pass filter (LPF) or band-pass filter (BPF) configured to remove unwanted signals from the down-converted signals to generate output baseband signals. Output baseband signals may be provided to the baseband circuitry XT04 for further processing. In some embodiments, the output baseband signals may be zero-frequency baseband signals, although this is not a requirement. In some embodiments, mixer circuitry XT06*a* of the receive signal path may comprise passive mixers, although the scope of the embodiments is not limited in this respect.

In some embodiments, the mixer circuitry XT06*a* of the transmit signal path may be configured to up-convert input baseband signals based on the synthesized frequency provided by the synthesizer circuitry XT06*d* to generate RF output signals for the FEM circuitry XT08. The baseband signals may be provided by the baseband circuitry XT04 and may be filtered by filter circuitry XT06c.

In some embodiments, the mixer circuitry XT06a of the receive signal path and the mixer circuitry XT06a of the transmit signal path may include two or more mixers and may be arranged for quadrature downconversion and upconversion, respectively. In some embodiments, the mixer circuitry XT06a of the receive signal path and the mixer circuitry XT06a of the transmit signal path may include two or more mixers and may be arranged for image rejection (e.g., Hartley image rejection). In some embodiments, the mixer circuitry XT06a of the receive signal path and the mixer circuitry XT06a of the transmit signal path may be arranged for direct downconversion and direct upconversion, respectively. In some embodiments, the mixer circuitry XT06a of the receive signal path and the mixer circuitry XT06a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry XT06 may include analog-to-digital converter (ADC) and digital-to-analog converter (DAC) circuitry and the baseband circuitry XT04 may include a digital baseband interface to communicate with the RF circuitry XT06.

In some dual-mode embodiments, a separate radio IC circuitry may be provided for processing signals for each spectrum, although the scope of the embodiments is not limited in this respect.

In some embodiments, the synthesizer circuitry XT06d may be a fractional-N synthesizer or a fractional N/N+1 synthesizer, although the scope of the embodiments is not limited in this respect as other types of frequency synthesizers may be suitable. For example, synthesizer circuitry XT06d may be a delta-sigma synthesizer, a frequency multiplier, or a synthesizer comprising a phase-locked loop with a frequency divider.

The synthesizer circuitry XT06d may be configured to synthesize an output frequency for use by the mixer circuitry XT06a of the RF circuitry XT06 based on a frequency input and a divider control input. In some embodiments, the synthesizer circuitry XT06d may be a fractional N/N+1 synthesizer.

In some embodiments, frequency input may be provided by a voltage controlled oscillator (VCO), although that is not a requirement. Divider control input may be provided by either the baseband circuitry XT04 or the applications processor XT02 depending on the desired output frequency. In some embodiments, a divider control input (e.g., N) may be determined from a look-up table based on a channel indicated by the applications processor XT02.

Synthesizer circuitry XT06d of the RF circuitry XT06 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry XT06d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry XT06 may include an IQ/polar converter.

FEM circuitry XT08 may include a receive signal path which may include circuitry configured to operate on RF signals received from one or more antennas XT10, amplify the received signals and provide the amplified versions of the received signals to the RF circuitry XT06 for further processing. FEM circuitry XT08 may also include a transmit signal path which may include circuitry configured to amplify signals for transmission provided by the RF circuitry XT06 for transmission by one or more of the one or more antennas XT10. In various embodiments, the amplification through the transmit or receive signal paths may be done solely in the RF circuitry XT06, solely in the FEM XT08, or in both the RF circuitry XT06 and the FEM XT08.

In some embodiments, the FEM circuitry XT08 may include a TX/RX switch to switch between transmit mode and receive mode operation. The FEM circuitry may include a receive signal path and a transmit signal path. The receive signal path of the FEM circuitry XT08 may include an LNA to amplify received RF signals and provide the amplified received RF signals as an output (e.g., to the RF circuitry XT06). The transmit signal path of the FEM circuitry XT08 may include a power amplifier (PA) to amplify input RF signals (e.g., provided by RF circuitry XT06), and one or more filters to generate RF signals for subsequent transmission (e.g., by one or more of the one or more antennas XT10).

In some embodiments, the PMC XT12 may manage power provided to the baseband circuitry XT04. In particular, the PMC XT12 may control power-source selection, voltage scaling, battery charging, or DC-to-DC conversion. The PMC XT12 may often be included when the device XT00 is capable of being powered by a battery, for example, when the device is included in a UE. The PMC XT12 may increase the power conversion efficiency while providing desirable implementation size and heat dissipation characteristics.

FIG. 15 shows the PMC XT12 coupled only with the baseband circuitry XT04. However, in other embodiments, the PMC XT12 may be additionally or alternatively coupled with, and perform similar power management operations for, other components such as, but not limited to, application circuitry XT02, RF circuitry XT06, or FEM XT08.

In some embodiments, the PMC XT12 may control, or otherwise be part of, various power saving mechanisms of the device XT00. For example, if the device XT00 is in an RRC_Connected state, where it is still connected to the RAN node as it expects to receive traffic shortly, then it may enter a state known as Discontinuous Reception Mode (DRX) after a period of inactivity. During this state, the device XT00 may power down for brief intervals of time and thus save power.

If there is no data traffic activity for an extended period of time, then the device XT00 may transition off to an RRC_Idle state, where it disconnects from the network and does not perform operations such as channel quality feedback, handover, etc. The device XT00 goes into a very low power state and it performs paging where again it periodically wakes up to listen to the network and then powers down again. The device XT00 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry XT02 and processors of the baseband circuitry XT04 may be used to execute elements of one or more instances of a protocol stack. For example, processors of the baseband circuitry XT04, alone or in combination, may be used to execute Layer 3, Layer 2, or Layer 1 functionality, while processors of the application circuitry XT02 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UF/RAN node, described in further detail below.

Figure 16:
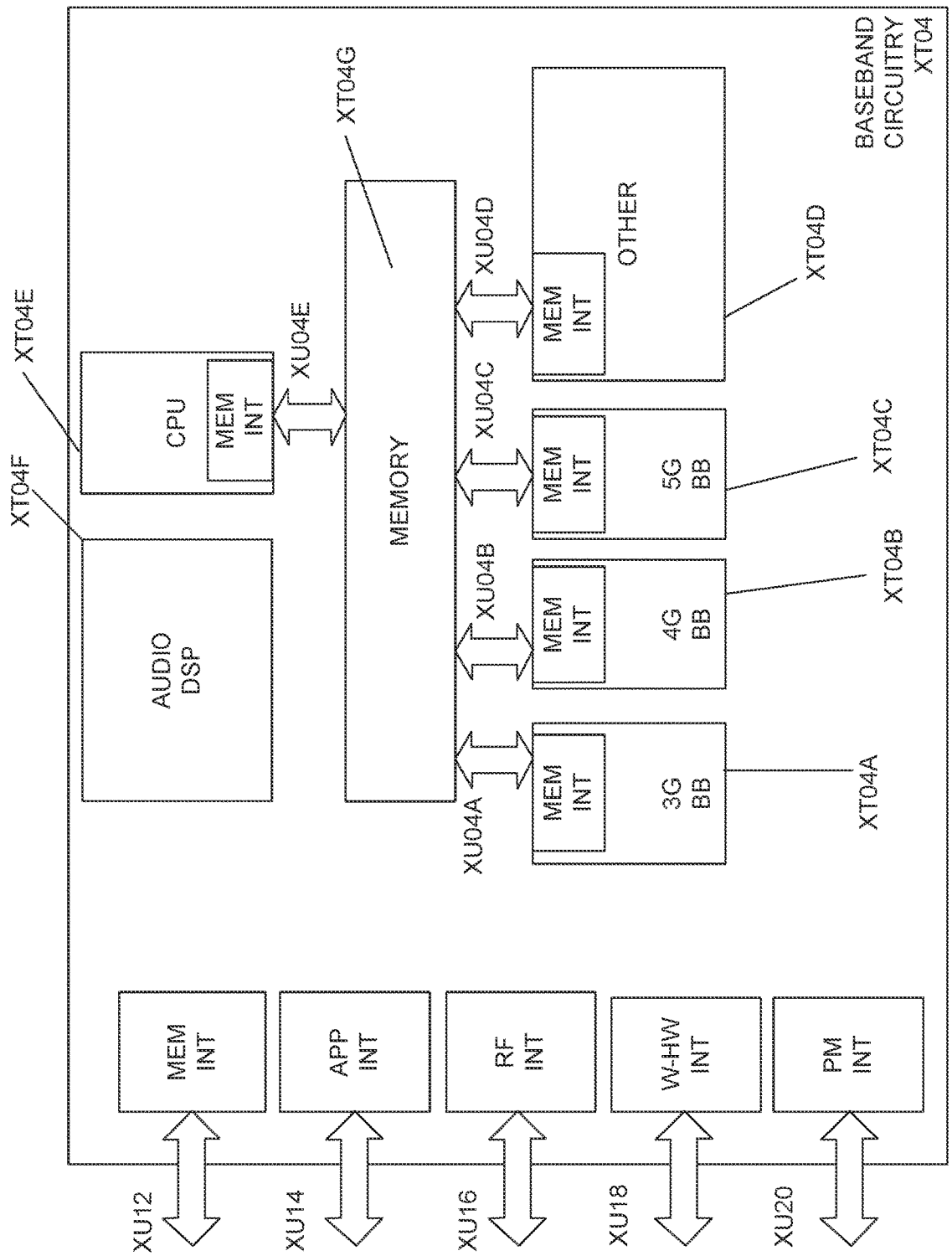
FIG. 16 illustrates example interfaces of baseband circuitry in accordance with some embodiments.

FIG. 16 illustrates example interfaces of baseband circuitry in accordance with some embodiments. As discussed above, the baseband circuitry XT04 of FIG. 15 may comprise processors XT04A-XT04E and a memory XT04G utilized by said processors. Each of the processors XT04A-XT04E may include a memory interface, XU04A-XU04E, respectively, to send/receive data to/from the memory XT04G.

The baseband circuitry XT04 may further include one or more interfaces to communicatively couple to other circuitries/devices, such as a memory interface XU12 (e.g., an interface to send/receive data to/from memory external to the baseband circuitry XT04), an application circuitry interface XU14 (e.g., an interface to send/receive data to/from the application circuitry XT02 of FIG. 15), an RF circuitry interface XU16 (e.g., an interface to send/receive data to/from RF circuitry XT06 of FIG. 15), a wireless hardware connectivity interface XU18 (e.g., an interface to send/receive data to/from Near Field Communication (NFC) components, Bluetooth® components (e.g., Bluetooth® Low Energy), Wi-Fi® components, and other communication components), and a power management interface XU20 (e.g., an interface to send/receive power or control signals to/from the PMC XT12).

Figure 17:
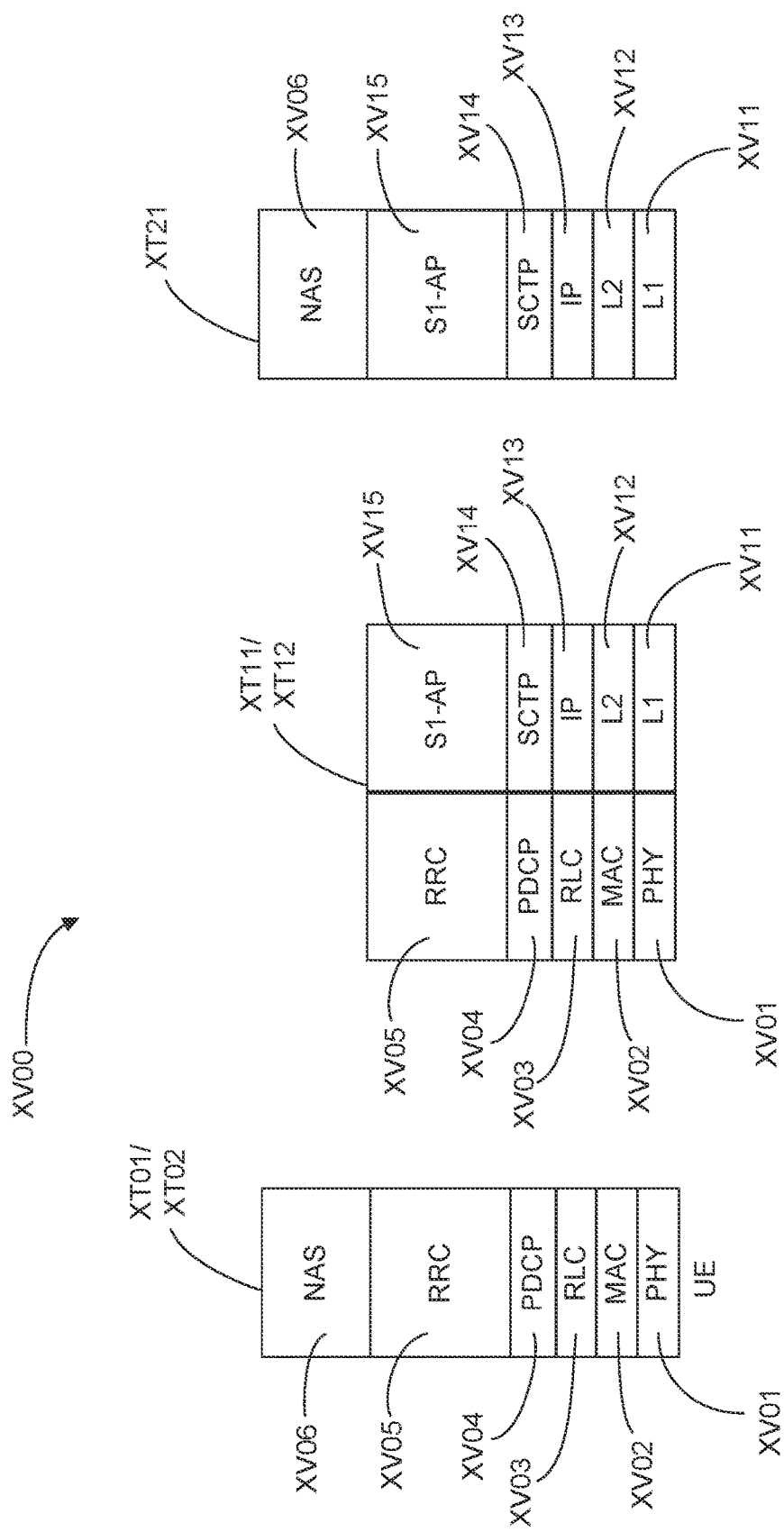
FIG. 17 is an illustration of a control plane protocol stack in accordance with some embodiments.

FIG. 17 is an illustration of a control plane protocol stack in accordance with some embodiments. In this embodiment, a control plane XV00 is shown as a communications protocol stack between the UE XS01 (or alternatively, the UE XS02), the RAN node XS11 (or alternatively, the RAN node XS12), and the MME XS21.

The PHY layer XV01 may transmit or receive information used by the MAC layer XV02 over one or more air interfaces. The PHY layer XV01 may further perform link adaptation or adaptive modulation and coding (AMC), power control, cell search (e.g., for initial synchronization and handover purposes), and other measurements used by higher layers, such as the RRC layer XV05. The PHY layer XV01 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer XV02 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer XV03 may operate in a plurality of modes of operation, including: Transparent Mode (TM), Unacknowledged Mode (UM), and Acknowledged Mode (AM). The RLC layer XV03 may execute transfer of upper layer protocol data units (PDUs), error correction through automatic repeat request (ARQ) for AM data transfers, and concatenation, segmentation and reassembly of RLC SDUs for UM and AM data transfers. The RLC layer XV03 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer XV04 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer XV05 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the DE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures. In some embodiments, the RRC layer may provide the UEs XS01 and XS02 with configurations for the antenna ports N for CSI-RS signal(s) and antenna ports K for codebook(s) according to the various embodiments discussed herein.

The UE XS01 and the RAN node XS11 may utilize a Uu interface (e.g., an LTE-Uu interface) to exchange control plane data via a protocol stack comprising the PHY layer XV01, the MAC layer XV02, the RLC layer XV03, the PDCP layer XV04, and the RRC layer XV05.

The non-access stratum (NAS) protocols XV06 form the highest stratum of the control plane between the UE XS01 and the MME XS21. The NAS protocols XV06 support the mobility of the UE XS01 and the session management procedures to establish and maintain IP connectivity between the UE XS01 and the P-GW XS23.

The S1 Application Protocol (S1-AP) layer XV15 may support the functions of the S1 interface and comprise Elementary Procedures (EPs). An EP is a unit of interaction between the RAN node XS11 and the CN XS20. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) XV14 may ensure reliable delivery of signaling messages between the RAN node XS11 and the MME XS21 based, in part, on the IP protocol, supported by the IP layer XV13. The L2 layer XV12 and the LI layer XV11 may refer to communication links (e.g., wired or wireless) used by the RAN node and the MME to exchange information.

The RAN node XS11 and the MME XS21 may utilize an S1-MME interface to exchange control plane data via a protocol stack comprising the L1 layer XV11, the L2 layer XV12, the IP layer XV13, the SCTP layer XV14, and the S1-AP layer XV15.

Figure 18:
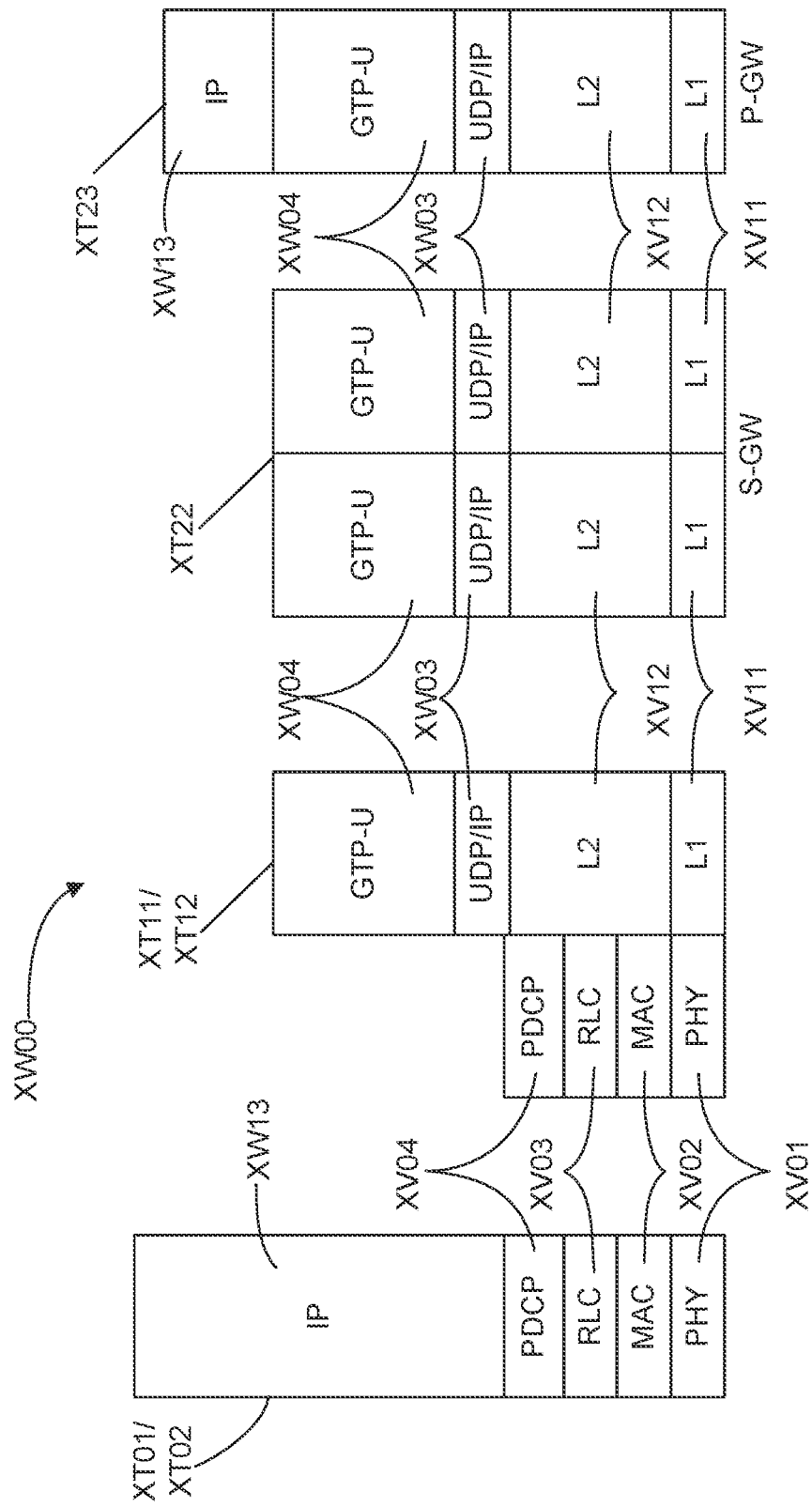
FIG. 18 is an illustration of a user plane protocol stack in accordance with some embodiments.

FIG. 18 is an illustration of a user plane protocol stack in accordance with some embodiments. In this embodiment, a user plane XW00 is shown as a communications protocol stack between the UE XS01 (or alternatively, the UE XS02), the RAN node XS11 (or alternatively, the RAN node XS12), the S-GW XS22, and the P-GW XS23. The user plane XW00 may utilize at least some of the same protocol layers as the control plane XV00. For example, the UE XS01 and the RAN node XS11 may utilize a Uu interface (e.g., an LTE-Uu interface) to exchange user plane data via a protocol stack comprising the PHY layer XV01, the MAC layer XV02, the RLC layer XV03, the PDCP layer XV04.

The General Packet Radio Service (GPRS) Tunneling Protocol for the user plane (GTP-U) layer XW04 may be used for carrying user data within the GPRS core network and between the radio access network and the core network. The user data transported can be packets in any of IPv4, IPv6, or PPP formats, for example. The UDP and IP security (UDP/IP) layer XW03 may provide checksums for data integrity, port numbers for addressing different functions at the source and destination, and encryption and authentication on the selected data flows. The RAN node XS11 and the S-GW XS22 may utilize an S1-U interface to exchange user plane data via a protocol stack comprising the L1 layer XV11, the L2 layer XV12, the UDP/IP layer XW03, and the GTP-U layer XW04. The S-GW XS22 and the P-GW XS23 may utilize an S5/S8a interface to exchange user plane data via a protocol stack comprising the L1 layer XV11, the L2 layer XV12, the UDP/IP layer XW03, and the GTP-U layer XW04. As discussed above with respect to FIG. 17, NAS protocols support the mobility of the UE XS01 and the session management procedures to establish and maintain IP connectivity between the UE XS01 and the P-GW XS23.

Figure 19:
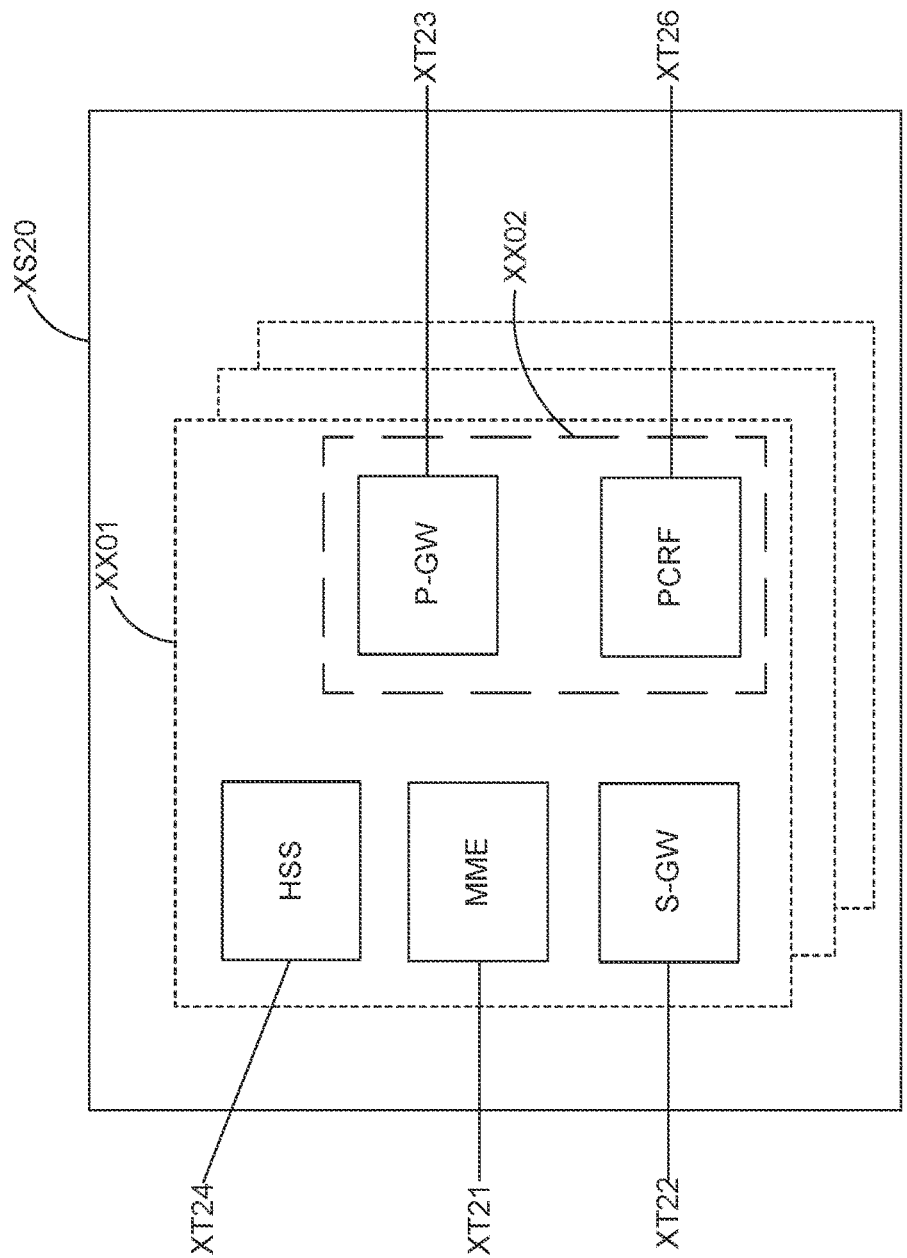
FIG. 19 illustrates components of a core network in accordance with some embodiments.

FIG. 19 illustrates components of a core network in accordance with some embodiments. The components of the CN XS20 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN XS20 may be referred to as a network slice XX01. A logical instantiation of a portion of the CN XS20 may be referred to as a network sub-slice XX02 (e.g., the network sub-slice XX02 is shown to include the PGW XS23 and the PCRF XS26).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 20:
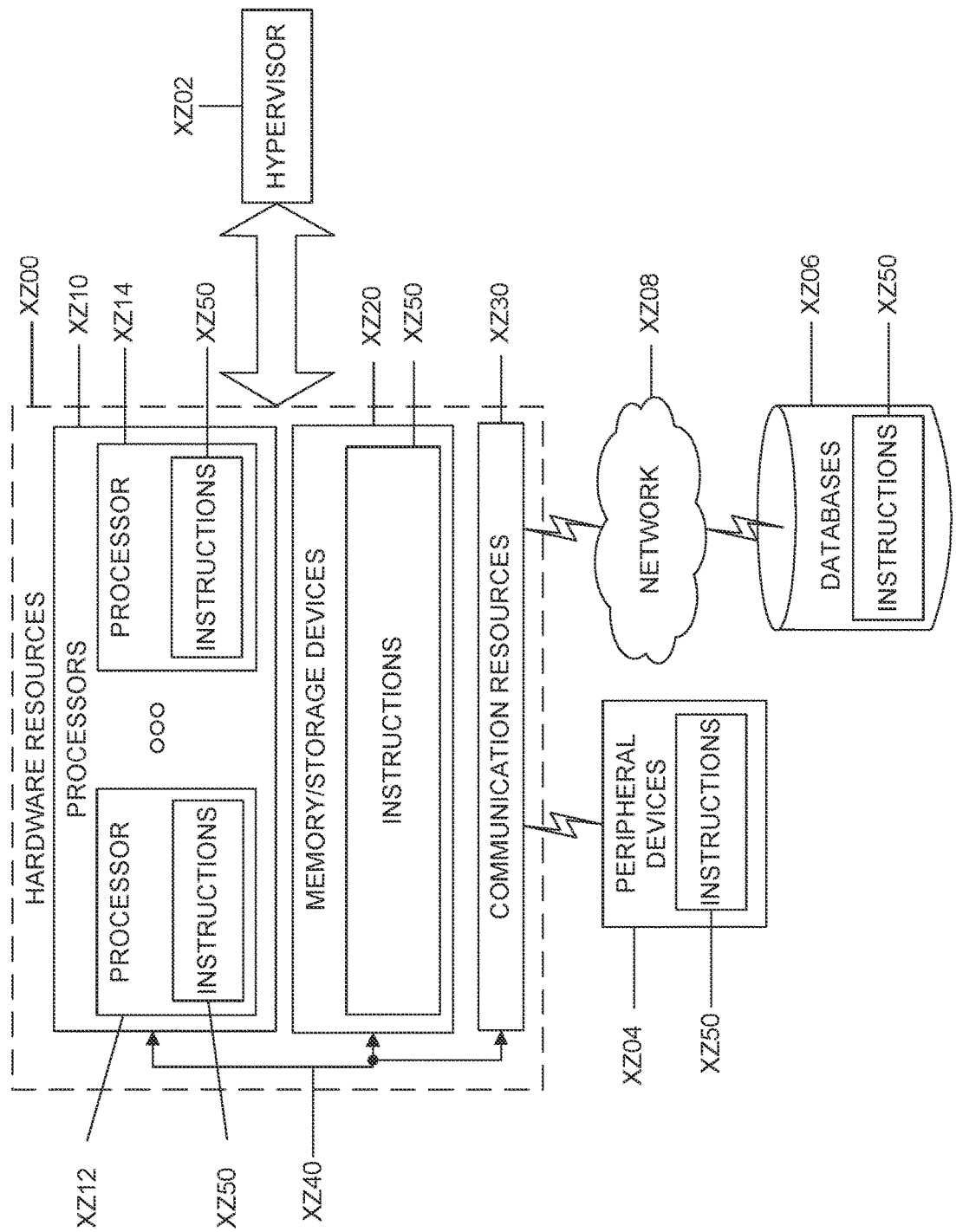
FIG. 20 is a block diagram illustrating components, according to some example embodiments, able to read instructions from a machine-readable or computer-readable medium (e.g., a non-transitory machine-readable storage medium) and perform any one or more of the methodologies discussed herein.

FIG. 20 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 20 shows a diagrammatic representation of hardware resources XZ00 including one or more processors (or processor cores) XZ10, one or more memory/storage devices XZ20, and one or more communication resources XZ30, each of which may be communicatively coupled via a bus XZ40. For embodiments where node virtualization (e.g., NFV) is utilized, a hypervisor XZ02 may be executed to provide an execution environment for one or more network slices/sub-slices to utilize the hardware resources XZ00.

The processors XZ10 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor XZ12 and a processor XZ14.

The memory/storage devices XZ20 may include main memory, disk storage, or any suitable combination thereof. The memory/storage devices XZ20 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources XZ30 may include interconnection or network interface components or other suitable devices to communicate with one or more peripheral devices XZ04 or one or more databases XZ06 via a network XZ08. For example, the communication resources XZ30 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions XZ50 may comprise software, a program, an application, an applet, an app, or other executable code for causing at least any of the processors XZ10 to perform any one or more of the methodologies discussed herein. The instructions XZ50 may reside, completely or partially, within at least one of the processors XZ10 (e.g., within the processor's cache memory), the memory/storage devices XZ20, or any suitable combination thereof. Furthermore, any portion of the instructions XZ50 may be transferred to the hardware resources XZ00 from any combination of the peripheral devices XZ04 or the databases XZ06. Accordingly, the memory of processors XZ10, the memory/storage devices XZ20, the peripheral devices XZ04, and the databases XZ06 are examples of computer-readable and machine-readable media.

In some embodiments, the electronic device(s), network(s), system(s), chip(s) or component(s), or portions or implementations thereof, of FIGS. 14-20, or some other figure herein may be configured to perform one or more processes, techniques, or methods as described herein, or portions thereof.

Example 1 may include a computer-readable medium having instructions stored thereof, wherein the instructions, in response to execution by a user equipment (UE), cause the UE to store a rank indicator (RI), a precoding matrix index (PMI), and a channel quality indicator (CQI) of channel state information (CSI) for the UE, concatenate the RI, the PMI, and the CQI to produce a concatenated CSI element, generate a CSI report that includes the concatenated CSI element, and cause the CSI report to be transmitted to a base station within a single slot.

Example 2 may include the computer-readable medium of example 1, wherein the instructions further cause the UE to concatenate the PMI and the CQI to produce a PMI-CQI value, encode the PMI-CQI value, and encode the RI, wherein to concatenate the RI, the PMI, and the CQI includes to concatenate the encoded PMI-CQI value with the encoded RI.

Example 3 may include the computer-readable medium of example 2, wherein to concatenate the encoded PMI-CQI value with the encoded RI includes to multiplex and interleave the encoded PMI-CQI value with the encoded RI.

Example 4 may include the computer-readable medium of example 2, wherein to cause the CSI report to be transmitted includes to map each encoded bit of the encoded PMI-CQI value to a different physical uplink control channel (PUCCH) symbol from each encoded bit of the encoded RI.

Example 5 may include the computer-readable medium of example 2, wherein to cause the CSI report to be transmitted includes to map each encoded bit of the encoded PMI-CQI value to a different physical uplink control channel (PUCCH) format from each encoded bit of the encoded RI.

Example 6 may include the computer-readable medium of example 2, wherein an encoding rate of the PMI-CQI value is greater than an encoding rate of the RI.

Example 7 may include the computer-readable medium of any of examples 1-6, wherein the instructions further cause the UE to encode the concatenated CSI element, and wherein the concatenated CSI element included in the CSI report is encoded.

Example 8 may include the apparatus of any of examples 1-6, wherein the instructions further cause the UE to encode the RI by Reed-Muller code, and encode the PMI and the CQI by polar code.

Example 9 may include the apparatus of any of examples 1-6, wherein the instructions further cause the UE to encode at least a portion of the RI using a demodulation reference signal (DMRS) sequence.

Example 10 may include the apparatus of any of examples 1-6, wherein the CSI report further includes one or more cyclic redundancy check (CRC) bits.

Example 11 may include the apparatus of any of examples 1-6, wherein the instructions further cause the UE to generate a joint index for the RI and the PMI, wherein to concatenate the RI, the PMI, and the CQI includes to concatenate the joint index with the CQI.

Example 12 may include the apparatus of example 11, wherein the instructions further cause the UE to encode the joint index, and encode the CQI, wherein to concatenate the RI, the PMI and the CQI includes to concatenate the encoded joint index with the encoded CQI.

Example 13 may include the apparatus of example 12, wherein to concatenate the encoded joint index with the encoded CQI includes to multiplex and interleave the encoded joint index with the encoded CQI.

Example 14 may include an apparatus for a base station (BS), comprising circuitry to identify a transmission associated with a rank indicator (RI) value received from a user equipment (UE), determine channel state information (CSI) from the transmission, and verify validity of the CSI based on a characteristic of the transmission, and memory to store the CSI.

Example 15 may include the apparatus of example 14 or any other example herein, wherein the transmission comprises a CSI report, to determine the CSI includes to decode the CSI report via a decoding procedure associated with a certain RI value to produce the CSI, and to verify the validity of the CSI includes to compare the CSI with one or more cyclic redundancy check (CRC) bits to determine the validity of the CSI.

Example 16 may include the apparatus of example 15 or any other example herein, wherein the circuitry, in response to determination that the CSI is invalid, is further to decode the CSI report via one or more other decoding procedures, each of the one or more other decoding procedures associated with other corresponding RI values, to produce one or more decoded CSI reports, and compare CSI of each of the decoded CSI reports with the one or more CRC bits to determine a one of the decoded CSI reports that is valid, and the memory to store the CSI of the one of the decoded CSI reports.

Example 17 may include the apparatus of any of examples 14-16 or any other example herein, wherein the transmission comprises a demodulation reference signal (DMRS), to determine the CSI includes to compare a sequence of the DMRS with a DMRS sequence associated with a certain RI value, and to verify the validity of the CSI includes to determine a signal to interference and noise ratio (SINR) associated with the DMRS sequence based on channel estimation, and compare the SINR to one or more SINRs associated with other DMRS sequences to determine the validity of the CSI.

Example 18 may include the apparatus of example 17 or any other example herein, wherein the circuitry, in response to determination that the CSI is invalid, is further to determine SINRs associated with each of the other DMRS sequences, and identify one DMRS sequence of the other DMRS sequences with a highest SINR, and determine an RI associated with the one DMRS sequence, and the memory is to store the RI associated with the one DMRS sequence.

Example 19 may include an apparatus for a user equipment (UE), comprising circuitry to identify an indication of a subset of antenna ports of a base station, perform channel measurements on the subset, and calculate channel state information (CSI) based on the channel measurements, and memory to store the CSI.

Example 20 may include the apparatus of example 19, wherein the indication of the subset of antenna ports includes an indication of a number of antenna ports in a first dimension and an indication of a number of antenna ports in a second dimension that produce the subset of antenna ports.

Example 21 may include the apparatus of any of examples 19 or 20 or any other example herein, wherein the circuitry is further to determine a codeword from a codebook based on the CSI, and generate a CSI report for transmission to the base station, wherein the CSI report includes the codeword, and the memory is to store the codeword.

Example 22 may include the apparatus of any of examples 19 or 20 or any other example herein, wherein a number of antenna ports within the subset is based on a number of antenna ports supported by the UE for channel measurement.

Example 23 may include an apparatus for a base station, comprising means for generating a message for transmission to a user equipment (UE), wherein the message includes an indication of a subset of antenna ports of the base station to be utilized by the UE for channel measurement, means for generating a channel state information reference signal (CSI-RS) for transmission on the subset of antenna ports for the UE, means for identifying channel state information (CSI) received from the UE, and means for storing the CSI.

Example 24 may include the apparatus of example 23, wherein the message that includes the indication of the subset includes an indication of a number of antenna ports in a first dimension and an indication of a number of antenna ports in a second dimension.

Example 25 may include the apparatus of any of examples 23 or 24, further comprising means for identifying a precoding matrix indicator (PMI) included in the CSI, means for determining precoding to be performed for the UE based on the PMI, and means for applying the precoding to transmissions sent from the subset of the antenna ports to the UE.

Example 26 may include a method comprising storing a rank indicator (RI), a precoding matrix index (PMI), and a channel quality indicator (CQI) of channel state information (CSI) for the UE, concatenating the RI, the PMI, and the CQI to produce a concatenated CSI element, generating a CSI report that includes the concatenated CSI element, and causing the CSI report to be transmitted to a base station within a single slot.

Example 27 may include the method of example 26 or any other example herein, further comprising concatenating the PMI and the CQI to produce a PMI-CQI value, encode the PMI-CQI value, and encoding the RI, wherein concatenating the RI, the PMI, and the CQI includes concatenating the encoded PMI-CQI value with the encoded RI.

Example 28 may include the method of example 27 or any other example herein, wherein concatenating the encoded PMI-CQI value with the encoded RI includes multiplexing and interleaving the encoded PMI-CQI value with the encoded RI.

Example 29 may include the method of example 27 or any other example herein, wherein causing the CSI report to be transmitted includes mapping each encoded bit of the encoded PMI-CQI value to a different physical uplink control channel (PUCCH) symbol from each encoded bit of the encoded RI.

Example 30 may include the method of example 27 or any other example herein, wherein causing the CSI report to be transmitted includes mapping each encoded bit of the encoded PMI-CQI value to a different physical uplink control channel (PUCCH) format from each encoded bit of the encoded RI.

Example 31 may include the method of example 27 or any other example herein, wherein an encoding rate of the PMI-CQI value is greater than an encoding rate of the RI.

Example 32 may include the method of any of examples 26-31 or any other example herein, further comprising encoding the concatenated CSI element, and wherein the concatenated CSI element included in the CSI report is encoded.

Example 33 may include the method of any of examples 26-31 or any other example herein, further comprising encoding the RI by Reed-Muller code, and encoding the PMI and the CQI by polar code.

Example 34 may include the method of any of examples 26-31 or any other example herein, further comprising encoding at least a portion of the RI using a demodulation reference signal (DMRS) sequence.

Example 35 may include the method of any of examples 26-31 or any other example herein, wherein the CSI report further includes one or more cyclic redundancy check (CRC) bits.

Example 36 may include the method of any of examples 26-31 or any other example herein, further comprising generating a joint index for the RI and the PMI, wherein concatenating the RI, the PMI, and the CQI includes concatenating the joint index with the CQI.

Example 37 may include the method of example 36 or any other example herein, further comprising encoding the joint index, and encoding the CQI, wherein concatenating the RI, the PMI and the CQI includes concatenating the encoded joint index with the encoded CQI.

Example 38 may include the method of example 37 or any other example herein, wherein concatenating the encoded joint index with the encoded CQI includes multiplexing and interleaving the encoded joint index with the encoded CQI.

Example 39 may include an method, comprising identifying a transmission associated with a rank indicator (RI) value received from a user equipment (UE), determining channel state information (CSI) from the transmission, verifying validity of the CSI based on a characteristic of the transmission, and storing the CSI.

Example 40 may include the method of example 39 or any other example herein, wherein the transmission comprises a CSI report, determining the CSI includes decoding the CSI report via a decoding procedure associated with a certain RI value to produce the CSI, and verifying the validity of the CSI includes to compare the CSI with one or more cyclic redundancy check (CRC) bits to determine the validity of the CSI.

Example 41 may include the method of example 40 or any other example herein, further comprising decoding, in response to determination that the CSI is invalid, the CSI report via one or more other decoding procedures, each of the one or more other decoding procedures associated with other corresponding RI values, to produce one or more decoded CSI reports, comparing CSI of each of the decoded CSI reports with the one or more CRC bits to determine a one of the decoded CSI reports that is valid, and storing the CSI of the one of the decoded CSI reports.

Example 42 may include the method of any of examples 39-41 or any other example herein, wherein the transmission comprises a demodulation reference signal (DMRS), determining the CSI includes comparing a sequence of the DMRS with a DMRS sequence associated with a certain RI value, and verifying the validity of the CSI includes determining a signal to interference and noise ratio (SINR) associated with the DMRS sequence based on channel estimation and comparing the SINR to one or more SINRs associated with other DMRS sequences to determine the validity of the CSI.

Example 43 may include the method of example 42 or any other example herein, further comprising determining, in response to determination that the CSI is invalid, SINRs associated with each of the other DMRS sequences, identifying one DMRS sequence of the other DMRS sequences with a highest SINR, determining an RI associated with the one DMRS sequence, and storing the RI associated with the one DMRS sequence.

Example 44 may include a method, comprising identifying an indication of a subset of antenna ports of a base station, performing channel measurements on the subset, calculating channel state information (CSI) based on the channel measurements, and storing the CSI.

Example 45 may include the method of example 44, wherein the indication of the subset of antenna ports includes an indication of a number of antenna ports in a first dimension and an indication of a number of antenna ports in a second dimension that produce the subset of antenna ports.

Example 46 may include the method of any of examples 44 or 45 or any other example herein, further comprising determining a codeword from a codebook based on the CSI, generating a CSI report for transmission to the base station, wherein the CSI report includes the codeword, and storing the codeword.

Example 47 may include the method of any of examples 44 or 45 or any other example herein, wherein a number of antenna ports within the subset is based on a number of antenna ports supported by the UE for channel measurement.

Example 48 may include a method, comprising generating a message for transmission to a user equipment (UE), wherein the message includes an indication of a subset of antenna ports of the base station to be utilized by the UE for channel measurement, generating a channel state information reference signal (CSI-RS) for transmission on the subset of antenna ports for the UE, identifying channel state information (CSI) received from the UE, and storing the CSI.

Example 49 may include the method of example 48 or any other example herein, wherein the message that includes the indication of the subset includes an indication of a number of antenna ports in a first dimension and an indication of a number of antenna ports in a second dimension.

Example 50 may include the method of any of examples 48 or 49 or any other example herein, further comprising identifying a precoding matrix indicator (PMI) included in the CSI, determining precoding to be performed for the UE based on the PMI, and applying the precoding to transmissions sent from the subset of the antenna ports to the UE.

Example 51 may include an apparatus to perform any of the methods of examples 26-50 or some other example.

Example 52 may include a means to perform any of the methods of examples 26-50 or some other example.

Example 53 may include a computer-readable medium having instructions stored thereon, wherein the instructions, in response to execution by an apparatus, cause the apparatus to perform any of the methods of examples 26-50 or some other example.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A base station (BS), comprising
circuitry configured to:
identify a transmission associated with a rank indicator (RI) value received from a user equipment (UE);
determine channel state information (CSI) from the transmission; and
verify validity of the CSI based on a characteristic of the transmission; and
a memory that stores the CSI.

2. The base station of claim 1,
wherein to determine the CSI, the circuitry is further configured to decode a CSI report via a decoding procedure associated with a certain RI value to produce the CSI, and
wherein the transmission comprises the CSI report.

3. The base station of claim 1, wherein to verify the validity of the CSI, the circuitry is further configured to compare the CSI with one or more cyclic redundancy check (CRC) bits to determine the validity of the CSI.

4. The base station of claim 3, wherein:
the circuitry, in response to determination that the CSI is invalid, is further configured to:
decode the CSI report via one or more other decoding procedures to produce one or more decoded CSI reports, wherein each of the one or more other decoding procedures is associated with other corresponding RI values; and
compare CSI of each of the decoded CSI reports with the one or more CRC bits to determine a one of the decoded CSI reports that is valid; and
wherein the memory stores the CSI of the one of the decoded CSI reports.

5. The base station of claim 1, wherein:
the transmission comprises a demodulation reference signal (DMRS), and
to determine the CSI, the circuitry is further configured to compare a sequence of the DMRS with a DMRS sequence associated with a certain RI value.

6. The base station of claim 5, wherein to verify the validity of the CSI, the circuitry is further configured to:

determine a signal to interference and noise ratio (SINR) associated with the DMRS sequence based on channel estimation; and compare the SINR to one or more SINRs associated with other DMRS sequences to determine the validity of the CSI.

7. The base station of claim 6, wherein:
the circuitry, in response to determination that the CSI is invalid, is further configured to:
determine SINRs associated with each of the other DMRS sequences;
identify one DMRS sequence of the other DMRS sequences with a highest SINR; and
determine an RI associated with the one DMRS sequence; and
wherein the memory stores the RI associated with the one DMRS sequence.

8. A method of operating a base station (BS), comprising:
identifying a transmission associated with a rank indicator (RI) value received from a user equipment (UE);
determining channel state information (CSI) from the transmission;
verifying validity of the CSI based on a characteristic of the transmission; and
storing the CSI.

9. The method of claim 8,
wherein determining the CSI further comprises decoding a CSI report via a decoding procedure associated with a certain RI value to produce the CSI, and
wherein the transmission comprises the CSI report.

10. The method of claim 8, wherein verifying the validity of the CSI further comprises comparing the CSI with one or more cyclic redundancy check (CRC) bits to determine the validity of the CSI.

11. The method of claim 10, further comprising:
in response to determining that the CSI is invalid, decoding the CSI report via one or more other decoding procedures to produce one or more decoded CSI reports, wherein each of the one or more other decoding procedures is associated with other corresponding RI values;
in response to determining that the CSI is invalid, comparing CSI of each of the decoded CSI reports with the one or more CRC bits to determine a one of the decoded CSI reports that is valid; and
storing the CSI of the one of the decoded CSI reports.

12. The method of claim 8, wherein:
the transmission comprises a demodulation reference signal (DMRS), and
determining the CSI further comprises comparing a sequence of the DMRS with a DMRS sequence associated with a certain RI value.

13. The method of claim 12, wherein verifying the validity of the CSI further comprises:
determining a signal to interference and noise ratio (SINR) associated with the DMRS sequence based on channel estimation; and
comparing the SINR to one or more SINRs associated with other DMRS sequences to determine the validity of the CSI.

14. The method of claim 13, further comprising:
in response to determining that the CSI is invalid, determining SINRs associated with each of the other DMRS sequences;
in response to determining that the CSI is invalid, identifying one DMRS sequence of the other DMRS sequences with a highest SINR;

in response to determining that the CSI is invalid, determining an RI associated with the one DMRS sequence; and
storing the RI associated with the one DMRS sequence.

15. A non-transitory computer-readable medium comprising instructions to cause a base station (BS), upon execution of the instructions by one or more processors of the BS, to perform one or more operations, the operations comprising:
identifying a transmission associated with a rank indicator (RI) value received from a user equipment (UE);
determining channel state information (CSI) from the transmission;
verifying validity of the CSI based on a characteristic of the transmission; and
storing the CSI to a memory.

16. The non-transitory computer-readable medium of claim 15,
wherein determining the CSI further comprises decoding a CSI report via a decoding procedure associated with a certain RI value to produce the CSI, and
wherein the transmission comprises the CSI report.

17. The non-transitory computer-readable medium of claim 15, wherein verifying the validity of the CSI further comprises comparing the CSI with one or more cyclic redundancy check (CRC) bits to determine the validity of the CSI.

18. The non-transitory computer-readable medium of claim 17, wherein the operations further comprise:
in response to determining that the CSI is invalid, decoding the CSI report via one or more other decoding procedures to produce one or more decoded CSI reports, wherein each of the one or more other decoding procedures is associated with other corresponding RI values;
in response to determining that the CSI is invalid, comparing CSI of each of the decoded CSI reports with the one or more CRC bits to determine a one of the decoded CSI reports that is valid; and
storing the CSI of the one of the decoded CSI reports.

19. The non-transitory computer-readable medium of claim 15, wherein:
the transmission comprises a demodulation reference signal (DMRS);
determining the CSI further comprises comparing a sequence of the DMRS with a DMRS sequence associated with a certain RI value; and
verifying the validity of the CSI further comprises:
determining a signal to interference and noise ratio (SINR) associated with the DMRS sequence based on channel estimation; and
comparing the SINR to one or more SINRs associated with other DMRS sequences to determine the validity of the CSI.

20. The non-transitory computer-readable medium of claim 19,
wherein the operations further comprise:
in response to determining that the CSI is invalid, determining SINRs associated with each of the other DMRS sequences;
in response to determining that the CSI is invalid, identifying one DMRS sequence of the other DMRS sequences with a highest SINR;
in response to determining that the CSI is invalid, determining an RI associated with the one DMRS sequence; and
storing the RI associated with the one DMRS sequence.

* * * * *

UNITED STATES PATENT AND TRADEMARK OFFICE
CERTIFICATE OF CORRECTION

PATENT NO. : 12,250,046 B2
APPLICATION NO. : 18/520202
DATED : March 11, 2025
INVENTOR(S) : Davydov et al.

It is certified that error appears in the above-identified patent and that said Letters Patent is hereby corrected as shown below:

In the Specification

In Column 20, Line 3, delete "MiMEs" and insert -- MMEs --.

In Column 25, Line 34, delete "UF/RAN" and insert -- UE/RAN --.

In the Claims

In Column 34, Claim 4, Line 48, after "to" insert -- a --.

In Column 34, Claim 4, Line 50, delete "the" and insert -- a --.

In Column 34, Claim 4, Line 55, delete "compare CSI of each of the decoded" and insert -- compare the CSI of each of the one or more decoded --.

In Column 34, Claim 4, Line 59, after "wherein the memory stores the CSI of the one of the decoded CSI reports" insert -- that is valid --.

In Column 35, Claim 11, Lines 42-43, delete "comparing CSI of each of the decoded" and insert -- comparing the CSI of each of the one or more decoded --.

In Column 35, Claim 11, Line 46, after "storing the CSI of the one of the decoded CSI reports" insert -- that is valid --.

In Column 36, Claim 18, Lines 35-36, delete "comparing CSI of each of the decoded" and insert -- comparing the CSI of each of the one or more decoded --.

In Column 36, Claim 18, Line 38, after "storing the CSI of the one of the decoded CSI reports" insert -- that is valid --.

Signed and Sealed this
Fifteenth Day of April, 2025

Coke Morgan Stewart
*Acting Director of the United States Patent and Trademark Office*